(12) United States Patent
Wade et al.

(10) Patent No.: US 8,040,620 B2
(45) Date of Patent: Oct. 18, 2011

(54) LENS DRIVE DEVICE

(75) Inventors: Tatsuki Wade, Nagano (JP); Toshifumi Tsuruta, Nagano (JP); Akihito Wada, Nagano (JP)

(73) Assignee: Nidec Sankyo Corporation (JP)

( * ) Notice: Subject to any disclaimer, the term of this patent is extended or adjusted under 35 U.S.C. 154(b) by 16 days.

(21) Appl. No.: 12/637,312

(22) Filed: Dec. 14, 2009

(65) Prior Publication Data
US 2010/0149668 A1 Jun. 17, 2010

(30) Foreign Application Priority Data

Dec. 12, 2008 (JP) ................................. 2008-316642
Feb. 25, 2009 (JP) ................................. 2009-042199

(51) Int. Cl.
*G02B 7/02* (2006.01)
(52) U.S. Cl. ........................................ 359/824; 359/823
(58) Field of Classification Search .................. 359/826, 359/694–704, 811–824
See application file for complete search history.

(56) References Cited

U.S. PATENT DOCUMENTS

| | | | | |
|---|---|---|---|---|
| 6,064,128 A | * | 5/2000 | Yagoto et al. | 310/12.04 |
| 7,639,440 B2 | * | 12/2009 | Ishizawa et al. | 359/824 |
| 2008/0074759 A1 | * | 3/2008 | Yamano | 359/739 |
| 2008/0297642 A1 | * | 12/2008 | Osaka | 348/335 |
| 2010/0315111 A1 | * | 12/2010 | Fan et al. | 324/756.01 |

FOREIGN PATENT DOCUMENTS

JP 2008-58659 A 3/2008

* cited by examiner

*Primary Examiner* — Mohammed Hasan
(74) *Attorney, Agent, or Firm* — Cantor Colburn LLP

(57) ABSTRACT

A lens drive device may include a movable body provided with a lens and a drive mechanism for driving the movable body in the optical axis direction. The drive mechanism may include a substantially triangular prism-shaped drive magnet part disposed in at least one of four corners of the lens drive device, and a drive coil wound around a substantially triangular tube shape and whose inner peripheral face is oppositely disposed to an outer peripheral face of the drive magnet part through a gap space. In at least another embodiment, a lens drive device may include a flat spring provided with a plurality of arm parts which connect a movable body fixed part with a fixed body fixed part. The arm part is formed with a low spring constant part whose spring constant is smaller than a spring constant of other portion of the arm part.

31 Claims, 16 Drawing Sheets

Maximum Stress at Calculation Point [MPa]

|  | P1 | P2 | P3 | P4 | P5 |
|---|---|---|---|---|---|
| This Embodiment | 580 | 60 | 684 | 84 | 848 |
| Comparison Example | 665 | 122 | 537 | 151 | 931 |

LENS DRIVE DEVICE

CROSS REFERENCE TO RELATED APPLICATION

The present invention claims priority under 35 U.S.C. §119 to Japanese Application No. 2008-316642 filed Dec. 12, 2008, and Japanese Application No. 2009-042199 filed Feb. 25, 2009, the entire contents of each of which are incorporated herein by reference.

FIELD OF THE INVENTION

An embodiment of the present invention may relate to a lens drive device which is mounted on a relatively small camera used in a cellular phone or the like.

BACKGROUND OF THE INVENTION

A lens drive device for driving a lens for a camera mounted on a cellular phone or the like has been known which includes a movable lens body holding a plurality of lenses and moving in an optical axis direction, and a fixed body which movably holds the movable lens body through two flat springs (see, for example, Japanese Patent Laid-Open No. 2008-58659). In this lens drive device, a drive coil is wound around an outer peripheral face of a cylindrical sleeve which structures the movable lens body. Further, in this lens drive device, four magnets are disposed so as to face an outer peripheral face of the drive coil.

Further, in this lens drive device, the flat spring is structured of a portion fixed to the fixed body, a portion fixed to the movable lens body, and three arm parts which connect the portion fixed to the fixed body with the portion fixed to the movable lens body. Width and thickness of the arm part of the flat spring used in the lens drive device are commonly constant.

In recent years, in a market of a camera used in a cellular phone or the like, demand for downsizing, i.e., smaller or thinner of a camera has been remarkably increased. Therefore, demand for downsizing of a lens drive device which is mounted on a camera has been also remarkably increased. On the other hand, in recent years, in a market of a camera used in a cellular phone or the like, demand for high pixel density and high resolution has become higher and thus a diameter of a lens mounted on the lens drive device is liable to be larger. Therefore, it is difficult to make the lens drive device smaller or thinner. Further, in order to make the lens drive device smaller and thinner, the flat spring structuring the lens drive device is also required to be smaller and thinner. However, when the flat spring is made smaller and thinner, strength of the flat spring is decreased. Therefore, when an impact due to dropping of the lens drive device or the like is applied to the lens drive device, damage or excessive deformation of the flat spring may occur.

SUMMARY OF THE INVENTION

In view of the first problem described above, at least an embodiment of the present invention may advantageously provide a lens drive device whose size is capable of being reduced even when a diameter of a mounted lens is larger in a case that the lens drive device viewed in the optical axis direction of a lens is formed in a substantially rectangular.

Further, in view of the second problem described above, at least an embodiment of the present invention may advantageously provide a lens drive device having a flat spring which is capable of restraining damage or excessive deformation due to an impact or the like even when the flat spring is made smaller or thinner.

According to at least an embodiment of the present invention, there may be provided a lens drive device whose shape is substantially rectangular when viewed in an optical axis direction of a lens including a movable body which is provided with the lens and which is movable in the optical axis direction, and a drive mechanism for driving the movable body in the optical axis direction. The drive mechanism includes a substantially triangular prism-shaped drive magnet part which is disposed at least one of four corners of the lens drive device, and a drive coil which is wound around a substantially triangular tube shape and whose inner peripheral face is oppositely disposed to an outer peripheral face of the drive magnet part through a gap space. The drive magnet part is magnetized so that magnetic flux passing through the drive coil is generated at a position facing the drive coil.

According to the lens drive device in accordance with an embodiment of the present invention, for example, substantially triangular prism-shaped drive magnet parts are disposed at four corners of the lens drive device whose shape is substantially rectangular when viewed in the optical axis direction of a lens. Further, a drive coil which is wound around in a substantially triangular tube shape is disposed so that its inner peripheral face faces an outer peripheral face of the drive magnet part through a gap space. Therefore, the drive magnet part and the drive coil are disposed at four corners of the lens drive device which are liable to be dead spaces.

Further, in accordance with an embodiment of the present invention, a drive coil is wound around a substantially triangular tube shape and its inner peripheral face is oppositely disposed to an outer peripheral face of the drive magnet part through a gap space, and the drive magnet part is magnetized so that magnetic flux passing through the drive coil is generated at a position facing the drive coil. Therefore, a magnetic circuit for driving the movable body is efficiently formed by utilizing the entire periphery of the drive magnet part and the entire periphery of the drive coil. Accordingly, even when the sizes of the drive magnet part and the drive coil are reduced, a desired drive force for driving the movable body can be obtained. In other words, the sizes of the drive magnet part and the drive coil can be reduced while a drive force for driving the movable body is secured.

As described above, according to an embodiment of the present invention, the sizes of the drive magnet part and the drive coil can be reduced and, in addition, the drive magnets and the drive coils can be disposed at four corners of the lens drive device which are liable to be dead spaces. Therefore, in accordance with an embodiment of the present invention, even when a diameter of a lens which is mounted on the lens drive device is larger, the size of the lens drive device can be reduced.

In accordance with an embodiment of the present invention, the drive magnet part is provided with two drive magnet pieces which are formed in a substantially triangular prism shape and are disposed to be superposed on each other in the optical axis direction, and opposite faces of the two drive magnet pieces to each other in the optical axis direction are magnetized in the same magnetic pole. According to this structure, the density of magnetic flux passing through the drive coil is increased between the opposite faces of the two drive magnet pieces. Therefore, a magnetic circuit for driving the movable body is further efficiently formed and thus the sizes of the drive magnet part and the drive coil can be further reduced.

In accordance with an embodiment of the present invention, a gap space is formed between two drive magnet pieces in the optical axis direction. Further, in accordance with an embodiment of the present invention, the drive magnet part is provided with a magnetic plate which is made of magnetic material and which is disposed between the two drive magnet pieces in the optical axis direction. According to examinations of the present inventors, when a magnetic plate is disposed between two drive magnet pieces, density of magnetic flux passing through the drive coil can be enhanced effectively.

In accordance with an embodiment of the present invention, a width of the drive coil in the optical axis direction is set to be not less than a sum of a distance between the opposite faces of the two drive magnet pieces which face in the optical axis direction and a moving distance of the movable body. According to this structure, density of magnetic flux passing through the drive coil can be uniformed at any position in the optical axis direction in a moving range of the movable body. Therefore, a drive force for the movable body can be stabilized in a moving range of the movable body.

In accordance with an embodiment of the present invention, the drive magnet part is disposed at four corners of the lens drive device, and a magnetic pole which is formed on an intermediate position in the optical direction of the drive magnet part is different from a magnetic pole formed on the intermediate position of another drive magnet part which is adjacent to each other in a circumferential direction of the lens drive device. Further, in accordance with an embodiment of the present invention, the drive magnet part is disposed at four corners of the lens drive device, and magnetic poles which are formed on the opposite faces of the two drive magnet pieces are different from magnetic poles formed on the opposite faces of two other drive magnet pieces which are adjacent to each other in a circumferential direction of the lens drive device. According to this structure, an effective magnetic circuit is formed between the drive magnet parts adjacent to each other in the circumferential direction of the lens drive device.

In accordance with an embodiment of the present invention, a case body which is formed of magnetic material in a substantially rectangular tube shape is disposed so as to surround the movable body and the drive mechanism. Further, in accordance with an embodiment of the present invention, the lens drive device includes a magnetic member which is formed of magnetic material and which is abutted with an end face of an object to be photographed side of the drive magnet part, and an opposite-to-object side magnetic member which is formed of magnetic material and which is abutted with an end face on an opposite-to-object side of the drive magnet part. According to this structure, leakage of magnetic flux generated from the drive magnet part is restrained and an effective magnetic circuit is formed.

In accordance with an embodiment of the present invention, the movable body includes a sleeve which is formed in a substantially cylindrical shape and whose inner peripheral side is disposed with the lens, and the sleeve is provided with a small diameter part disposed on the object to be photographed side and a large diameter part which is disposed on the opposite-to-object side and whose outer diameter is larger than the small diameter part, and the drive coil is fixed to an outer peripheral face of the small diameter part. According to this structure, in comparison with a case that the drive coil is fixed to the outer peripheral face of the large diameter part, the drive magnet part can be disposed at a nearer position to the sleeve. Therefore, the lens drive device can be made smaller.

In accordance with an embodiment of the present invention, the drive magnet part and the drive coil are disposed at four corners of the lens drive device, and one conducting wire is successively wound around to form the four drive coils. In this case, the number of power supply terminals for supplying an electric current to four drive coils is reduced and the structure of the lens drive device is simplified.

Further, in accordance with an embodiment of the present invention, the drive magnet part and the drive coil are disposed at four corners of the lens drive device, and four drive coils are formed of four conducting wires which are wound around respectively. In this case, an electric current is supplied to four drive coils individually. Therefore, inclination of a lens which is held by the movable body can be corrected by means of that directions of electric currents and current values supplied to four drive coils are controlled.

Further, according to at least an embodiment of the present invention, there may be provided a lens drive device including a movable body which holds a lens and which is movable in an optical axis direction of the lens, a fixed body which movably holds the movable body in the optical axis direction, a drive mechanism for driving the movable body in the optical axis direction, and a flat spring which is provided with a movable body fixed part which is fixed to the movable body, a fixed body fixed part which is fixed to the fixed body, and a plurality of arm parts which connect the movable body fixed part with the fixed body fixed part. The arm part is formed with a low spring constant part whose spring constant is smaller than a spring constant of other portion of the arm part.

In the lens drive device in accordance with the embodiment of the present invention, a flat spring is provided with a movable body fixed part which is fixed to the movable body, a fixed body fixed part which is fixed to the fixed body, and a plurality of arm parts which connect the movable body fixed part with the fixed body fixed part. In addition, a part of the arm part is formed to be a low spring constant part whose spring constant is smaller than that of other portion of the arm part. Therefore, in accordance with the embodiment of the present invention, even when the flat spring is made smaller and thinner, damage or excessive deformation of the flat spring due to an impact or the like applied to the lens drive device is restrained.

In other words, according to examinations of the present inventors, when a width and a thickness of the entire arm part are constant and a spring constant of the arm part is constant, stress occurred in the flat spring due to an impact is concentrated on a connected portion of the movable body fixed part with the arm part and a connected portion of the fixed body fixed part with the arm part. Therefore, when the flat spring is made smaller and thinner, damage or excessive deformation is easily occurred in the connected portions of the movable body fixed part with the arm part and of the fixed body fixed part with the arm part.

On the other hand, in accordance with the embodiment of the present invention, a part of the arm part is formed to be the low spring constant part and thus, when an impact is applied to the lens drive device, stress is concentrated on the low spring constant part together with the connected portions of the movable body fixed part with the arm part and of the fixed body fixed part with the arm part. In other words, stress occurred in the flat spring when the impact is applied to the lens drive device is distributed to the low spring constant part in addition to the connected portions of the movable body fixed part with the arm part and of the fixed body fixed part with the arm part. Therefore, according to the embodiment of the present invention, stresses applied to the connected portions of the movable body fixed part with the arm part and of the fixed body fixed part with the arm part due to an impact are reduced and, as a result, even when the flat spring is made smaller and thinner, damage or excessive deformation of the flat spring due to an impact or the like applied to the lens drive device is restrained.

In accordance with an embodiment of the present invention, the arm part is formed in a substantially circular arc shape, and the low spring constant part is formed at an intermediate portion in a circumferential direction of the arm part. Further, in accordance with an embodiment of the present invention, the arm part is formed in a substantially circular arc shape and the low spring constant part is formed with a substantially equal interval in the circumferential direction of the arm part. According to this structure, stress to the connected portions of the movable body fixed part with the arm part and of the fixed body fixed part with the arm part due to an impact are reduced in a well-balanced manner.

In accordance with an embodiment of the present invention, a plurality of the arm parts are disposed with a substantially equal angular pitch around an optical axis of the lens, and low spring constant parts of a plurality of the arm parts are disposed with a substantially equal angular pitch around the optical axis. According to this structure, even when a force due to an impact is applied to the flat spring in any direction, stress occurred in the flat spring is distributed to connected portions of the movable body fixed part with the arm parts, connected portions of the fixed body fixed part with the arm parts, and the low spring constant parts in a well-balanced manner.

In accordance with an embodiment of the present invention, the arm part is formed in a substantially circular arc shape, and a width of the low spring constant part in a radial direction of the arm part is formed to be gradually narrower than a width in the radial direction of other portion of the arm part except the low spring constant part. According to this structure, even when the entire thickness of the arm part in the optical axis direction is constant, the arm part is formed with a low spring constant part. Therefore, when a low spring constant part is to be formed in the arm part, the flat spring is structured by press working or etching process. In other words, even when a low spring constant part is to be formed in the arm part, a smaller and thinner flat spring can be structured in a relatively easy manner.

In accordance with an embodiment of the present invention, the drive mechanism includes a drive magnet part which is formed in a substantially column shape and which is fixed to the fixed body, and a drive coil which is wound around in a substantially tube shape, which is fixed to the movable body, and which is disposed so that an inner peripheral face of the drive coil faces an outer peripheral face of the drive magnet part through a gap space. Further, the arm part is formed in a substantially circular arc shape and the drive magnet part is disposed on an outer side in the radial direction of the arm part, and the low spring constant part is formed so that an outer peripheral face of the arm part is recessed toward an inner peripheral side of the arm part. The low spring constant part is formed so that its width is set to be gradually narrower and, in a case that the arm part is formed in a circular arc shape, it is preferable that an outer peripheral face of the circular arc shaped arm part is cut off in a substantially straight shape to be recessed toward the inner peripheral side. According to this structure, an arrangement space for the drive magnet part is increased while preventing interference of the drive magnet part, which is disposed on the outer side in the radial direction of the arm part, with the arm part. Therefore, even when an outward size of the lens drive device is not increased, the drive magnet part can be formed larger and a drive force of the drive mechanism can be improved.

In accordance with an embodiment of the present invention, a case body is provided which is formed in a substantially rectangular tube shape so that a shape of the case body when viewed in the optical axis direction is formed in a substantially rectangular shape, and which structures a side face of the lens drive device. In addition, the drive mechanism includes a substantially triangular prism-shaped drive magnet part which is disposed at least one of four corners of the case body, and a drive coil which is wound around in a substantially triangular tube shape and which is disposed so that an inner peripheral face of the drive coil faces an outer peripheral face of the drive magnet part through a gap space, and the fixed body fixed part is formed in a substantially rectangular frame shape and is disposed along an inner peripheral face of the case body, and the movable body fixed part is disposed on an inner side of the fixed body fixed part, and connected portions of the fixed body fixed part with the arm parts are formed at substantially intermediate positions of four straight side parts structuring the fixed body fixed part. Further, it is preferable that the low spring constant part is formed so that an outer peripheral face of the arm part facing a straight part of the substantially triangular prism-shaped drive magnet part is cut off in a substantially straight shape. According to this structure, an arrangement space for the drive mechanism is increased while preventing interference of the drive mechanism disposed at four corners of the case body with the arm parts. Therefore, even when the outward size of the lens drive device is not increased, the drive mechanism can be increased and a drive force of the drive mechanism can be improved.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 17(A) is a plan view showing a flat spring in accordance with an embodiment of the present invention and FIG. 17(B) is a plan view showing a flat spring in accordance with a comparison example.

DETAILED DESCRIPTION OF THE PREFERRED EMBODIMENTS

A lens drive device in accordance with an embodiment of the present invention which is capable of reducing its size even when a diameter of a lens becomes larger will be described below with reference to the accompanying drawings.

Figure 1:
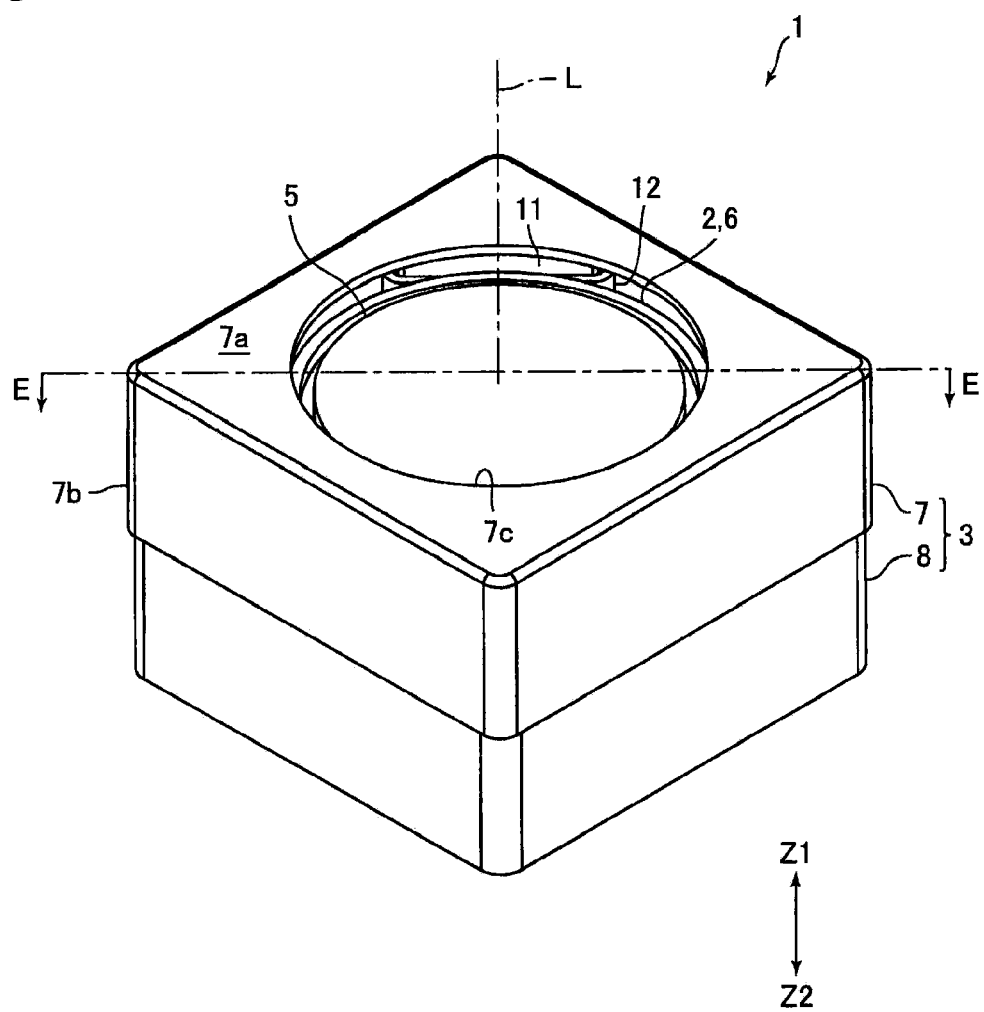
FIG. 1 is a perspective view showing a lens drive device in accordance with an embodiment of the present invention.
Figure 2:
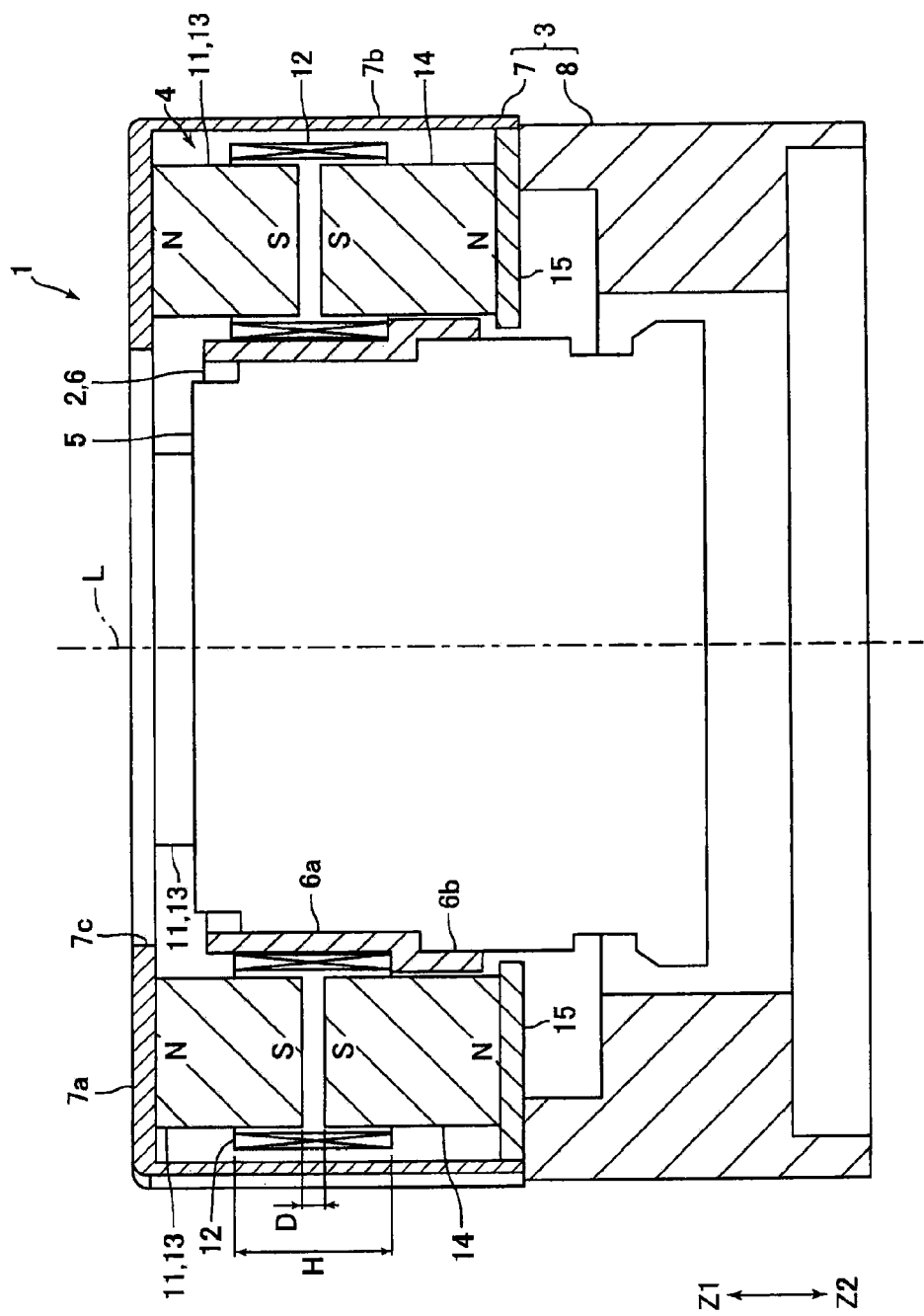
FIG. 2 is a cross-sectional view showing the lens drive device which is cut by the line "E-E" in FIG. 1.
Figure 3:
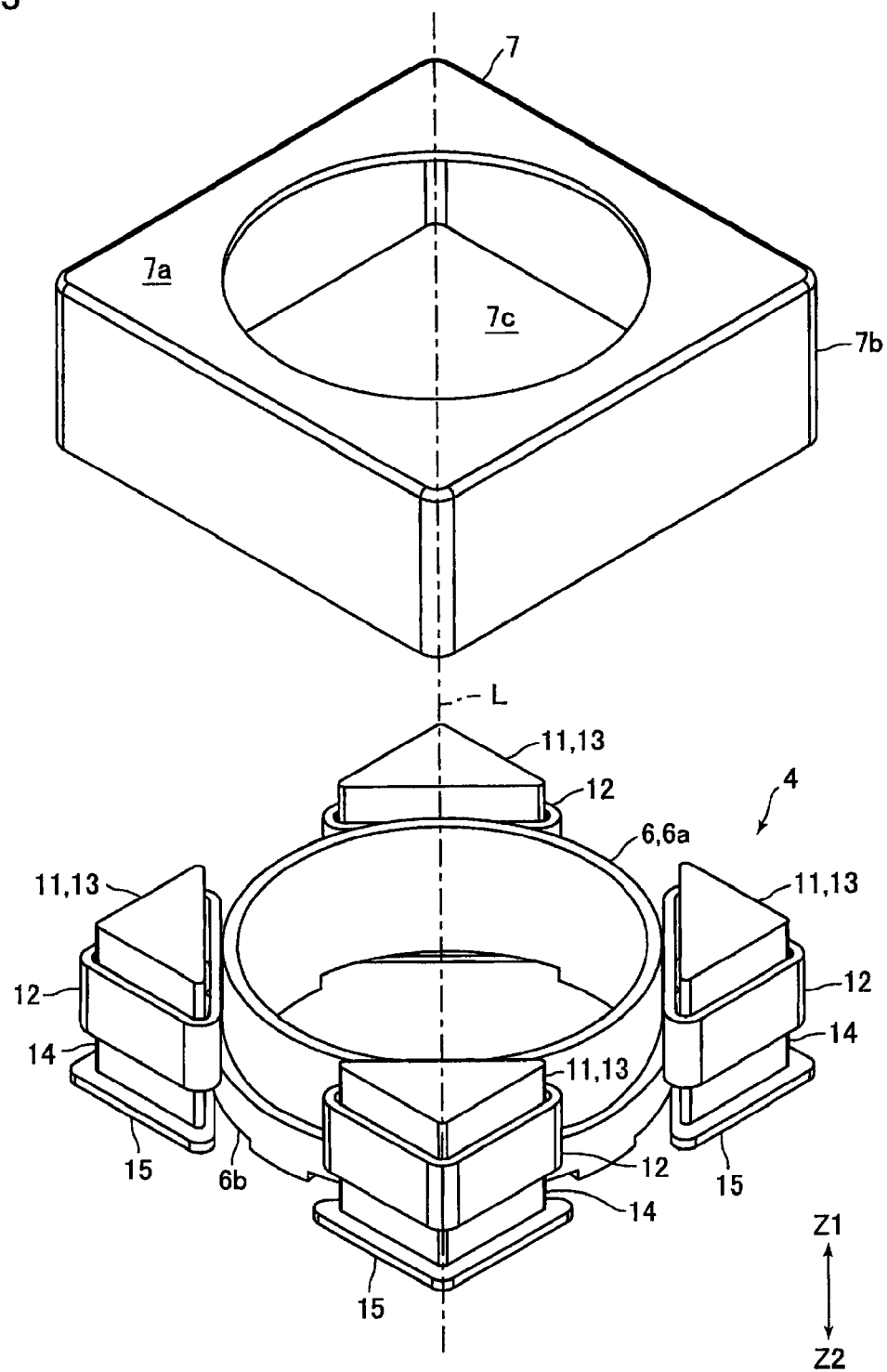
FIG. 3 is an exploded perspective view showing a part of the lens drive device shown in FIG. 1.

FIG. 1 is a perspective view showing a lens drive device 1 in accordance with an embodiment of the invention. FIG. 2 is a cross-sectional view showing the lens drive device 1 which is cut by the "E-E" line in FIG. 1. FIG. 3 is an exploded perspective view showing a part of the lens drive device 1 shown in FIG. 1.

A lens drive device 1 in this embodiment is mounted on a relatively small camera which is used in a cellular phone or the like. As shown in FIG. 1, an outer shape of the lens drive device 1 is formed in a substantially rectangular prism shape. In other words, the lens drive device 1 is formed so that a shape viewed from a direction of an optical axis "L" of a lens for photography (optical axis direction) is substantially quadrangular. In this embodiment, the lens drive device 1 is formed so that a shape viewed from the optical axis direction is substantially square.

In the camera on which the lens drive device 1 in this embodiment is mounted, an imaging element (not shown) is disposed on a lower side ("Z2" direction side) in FIG. 2, and an object to be photographed which is disposed on an upper side ("Z1" direction side) in FIG. 2 is photographed. Therefore, in the following description, the "Z1" direction side is the object to be photographed side, i.e., the object side, and the "Z2" direction side is the opposite-to-object side (imaging element side).

As shown in FIGS. 1 through 3, the lens drive device 1 includes a movable body 2, which holds a lens for photography and which is movable in the optical axis direction, a fixed body 3 for movably holding the movable body 2 in the optical axis direction, and a drive mechanism 4 for driving the movable body 2 in the optical axis direction.

The movable body 2 includes a sleeve 6 for holding a lens holder 5 which is fixed with a plurality of lenses. The lens holder 5 is formed in a substantially cylindrical shape and a plurality of lenses whose shape viewed from the optical axis direction is substantially circular are fixed on its inner peripheral side. Further, the sleeve 6 is substantially formed in a cylindrical shape and the lens holder 5 is held on its inner peripheral side.

In this embodiment, a small diameter lens whose diameter is smaller is disposed on an object side of the lens holder 5 and a large diameter lens whose diameter is larger than the small diameter lens is disposed on an opposite-to-object side. Therefore, as shown in FIG. 2, an outer diameter of the object side of the lens holder 5 is smaller than an outer diameter of its opposite-to-object side. Further, since the outer diameter of the object side of the lens holder 5 is smaller than the outer diameter of its opposite-to-object side, the sleeve 6 is, as shown in FIG. 2, is formed in a substantially cylindrical shape having a stepped portion. In other words, the sleeve 6 is structured of a small diameter part 6a disposed on the object side and a large diameter part 6b, which is disposed on the opposite-to-object side and is provided with a larger inner diameter and a larger outer diameter than the small diameter part 6a.

A male screw is formed on the outer peripheral face of the lens holder 5 and a female screw which engages with the male screw formed on the outer peripheral face of the lens holder 5 is formed on the inner peripheral face of the sleeve 6. Further, an object side end and an opposite-to-object side end of the sleeve 6 are fixed with one end portions of the flat springs (not shown). The other end portions of the flat springs are fixed to the fixed body 3 and thus the movable body 2 is held by the fixed body 3 through the flat springs.

The fixed body 3 includes a first case body 7 disposed on the object side and a second case body 8 which is disposed on the opposite-to-object side. The first case body 7 is made of magnetic material and is formed in a substantially rectangular bottomed tube shape provided with a bottom part 7a and a tube part 7b. A circular through hole 7c is formed at a center of the bottom part 7a which is disposed on the object side. The first case body 7 is disposed so as to surround the outer peripheral sides of the movable body 2 and the drive mechanism 4. The second case body 8 is made, for example, of resin material and is formed in a substantially rectangular tube shape. The second case body 8 is attached to an opposite-to-object side end of the first case body 7 so as to surround the outer peripheral side on the opposite-to-object side of the lens holder 5.

The drive mechanism 4 includes four drive magnet parts 11 which are formed in a substantially triangular prism shape and are disposed at four corners of the lens drive device 1 (specifically, four corners on the inner side of the first case body 7), and four drive coils 12 which are wound around in a substantially triangular tube shape and are disposed so that their inner peripheral faces are faced to outer peripheral faces of the drive magnet parts 11 through gap spaces. A detailed structure of the drive mechanism 4 will be described below.

Figure 4:
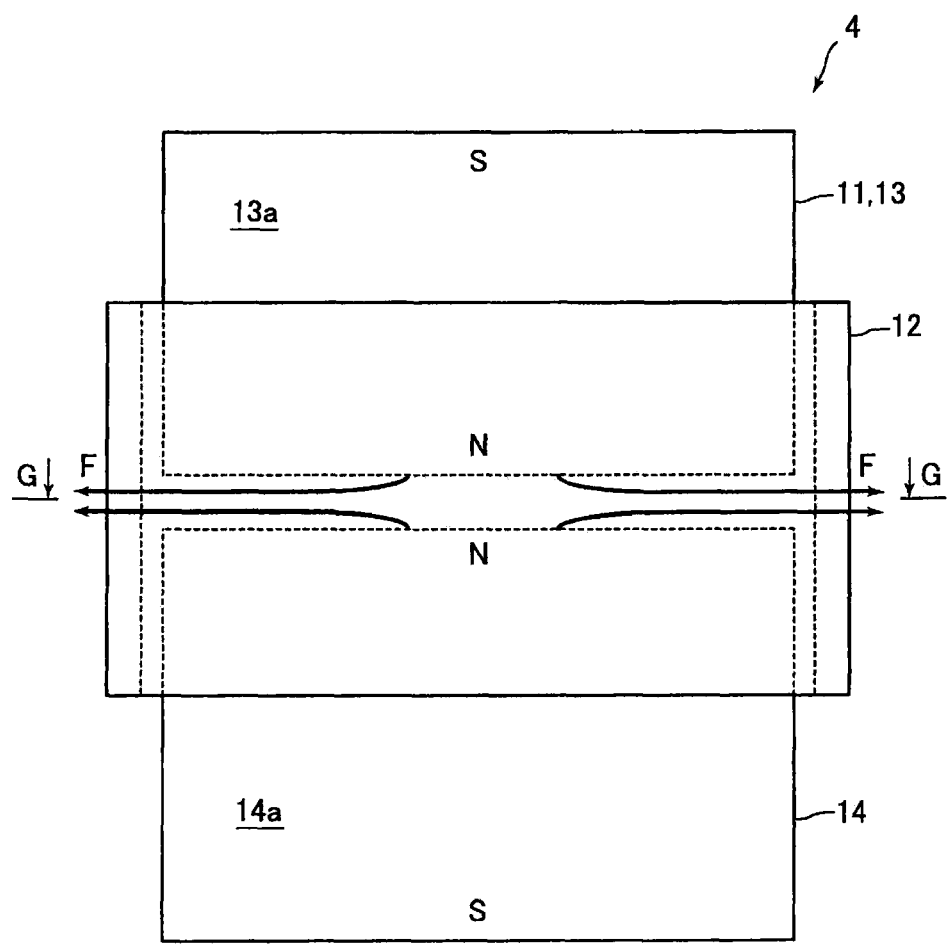
FIG. 4 is a side view showing a drive magnet part and a drive coil shown in FIG. 3.
Figure 5:
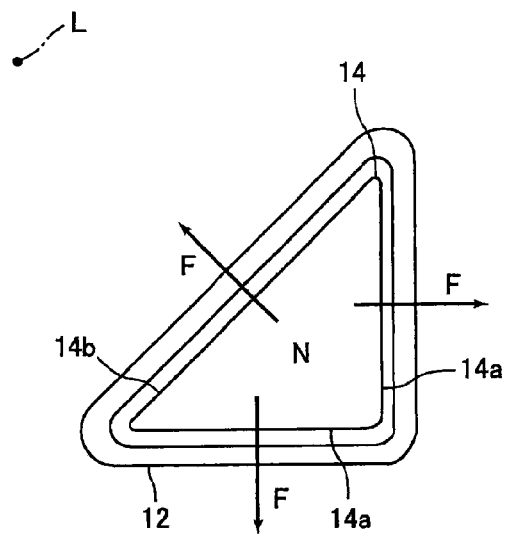
FIG. 5 is an explanatory view showing a drive magnet piece and the drive coil which is viewed in the "G-G" direction in FIG. 4.
Figure 6:
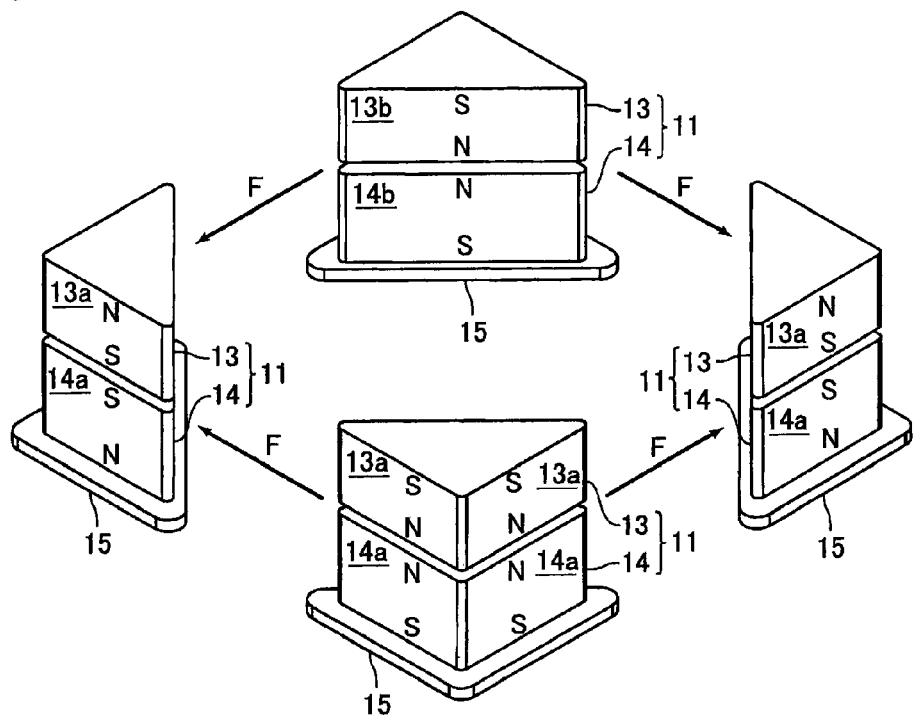
FIG. 6 is an explanatory view showing magnetized states of drive magnet parts which are disposed at four corners of the lens drive device shown in FIG. 1.

FIG. 4 is a side view showing the drive magnet part 11 and the drive coil 12 shown in FIG. 3. FIG. 5 is an explanatory view showing a drive magnet piece 14 and the drive coil 12 which are viewed from the "G-G" direction in FIG. 4. FIG. 6 is an explanatory view showing magnetized states of the drive magnet parts 11 which are disposed at four corners of the lens drive device 1 shown in FIG. 1.

The drive magnet part 11 is provided with two drive magnet pieces 13 and 14 which are formed in a substantially triangular prism shape and disposed to superpose on each other in the optical axis direction. In this embodiment, the drive magnet piece 13 is disposed on the object side and the drive magnet piece 14 is disposed on the opposite-to-object side. Further, the drive magnet piece 13 and the drive magnet piece 14 are disposed so as to have a predetermined gap space between them in the optical axis direction. In other words, a predetermined gap space is formed between the drive magnet piece 13 and the drive magnet piece 14 in the optical axis direction.

The drive magnet pieces 13 and 14 are formed so that their shapes viewed in the optical axis direction are a substantially rectangular equilateral triangle. As shown in FIGS. 5 and 6, the drive magnet pieces 13 and 14 are provided with two rectangular flat parts 13a and 14a, which are parallel to the optical axis "L" and perpendicular to each other, and rectangular slant face parts 13b and 14b which are parallel to the optical axis "L". Two flat parts 13a are connected through the slant face part 13b and two flat parts 14a are connected through the slant face part 14b. In this embodiment, the drive magnet pieces 13 and 14 are disposed so that the inner peripheral face of the tube part 7b of the first case body 7 are substantially parallel to the flat parts 13a and 14a. In other words, two drive magnet pieces 13 and 14 which are disposed at diagonal positions on the inner side of the first case body 7 are disposed so that the slant face parts 13b and 14b are faced each other.

The drive magnet piece 13 is fixed to the bottom part 7a of the first case body 7. Specifically, an end face on the object side of the drive magnet piece 13 is fixed to an opposite-to-object side face of the bottom part 7a and thus the end face of the object side of the drive magnet piece 13 is abutted with the opposite-to-object side face of the bottom part 7a. The bottom part 7a of the first case body 7 in this embodiment is an object side magnetic member which is abutted with the end face on the object side of the drive magnet part 11.

An end face on the opposite-to-object side of the drive magnet piece 14 is fixed with a magnetic plate 15 which is made of magnetic material and formed in a flat plate shape, and the end face on the opposite-to-object side of the drive magnet piece 14 is abutted with the magnetic plate 15. The magnetic plate 15 is formed so that its shape viewed in the optical axis direction is a substantially rectangular equilateral triangle. As shown in FIG. 6, the magnetic plate 15 is fixed to the drive magnet piece 14 so that its oblique side part is substantially parallel to the slant face part 14b of the drive magnet piece 14. Further, the magnetic plate 15 is abutted with the inner peripheral face of the tube part 7b of the first case body 7. The magnetic plate 15 in this embodiment is an opposite-to-object side magnetic member which is abutted with the end face on the opposite-to-object side of the drive magnet part 11.

The drive coil 12 is, as shown in FIG. 5, wound around so that its shape viewed in the optical axis direction is a substantially rectangular equilateral triangle. Four drive coils 12 are, as shown in FIG. 2, fixed to the outer peripheral face of the small diameter part 6a of the sleeve 6. Specifically, four drive coils 12 are fixed to the outer peripheral face of the small diameter part 6a with a substantially 90° pitch so that the inner peripheral faces of the drive coils 12 and the outer peripheral faces of the drive magnet parts 11 are substantially parallel to each other through predetermined gap spaces. The drive coils 12 are disposed at four corners on the inner side of the first case body 7. In accordance with this embodiment, the drive coils 12 are disposed at four corners on the inner side of the first case body 7 with predetermined gap spaces between the inner peripheral face of the first case body 7 and the drive coils 12, and the drive coils 12 are movable in the optical axis direction together with the sleeve 6.

In this embodiment, when an electric current is not supplied to the drive coils 12, as shown in FIG. 2, the drive magnet part 11 and the drive coil 12 are disposed so that a center position of the drive coil 12 in the optical axis direction is substantially coincided with a center position between opposite faces of the drive magnet pieces 13 and 14 facing each other in the optical axis direction. Further, a width "H" of the drive coil 12 in the optical axis direction (see FIG. 2) is set to be a sum or more of a distance "D" (see FIG. 2) between the opposite faces of the drive magnet pieces 13 and 14 facing each other in the optical axis direction and a moving distance of the movable body 2. Therefore, in this embodiment, the opposite-to-object side end of the drive coil 12 does not move to the object side relative to the object side end of the drive magnet piece 14, and the object side end of the drive coil 12 does not move to the opposite-to-object side relative to the opposite-to-object side end of the drive magnet piece 13. In this embodiment, four drive coils 12 are formed by using one conducting wire, which is wound around successively to form four drive coils 12.

As shown in FIGS. 4 and 6, two drive magnet pieces 13 and 14 structuring the drive magnet part 11 are disposed so that the same magnetic poles ("S"-pole and "S"-pole, or "N"-pole and "N"-pole) are faced each other in the optical axis direction. In other words, opposite faces of the drive magnet pieces 13 and 14 are magnetized in the same magnetic pole respectively. Therefore, as shown in FIGS. 4 and 5, magnetic flux "F" passing through three faces of the drive coil 12 is generated between the drive magnet pieces 13 and 14. In other words, the drive magnet part 11 is magnetized so that the magnetic flux "F" passing through the drive coil 12 is generated at a position where the drive magnet part 11 faces the drive coil 12.

As shown in FIG. 6, the magnetic poles which are formed on opposite faces of two drive magnet pieces 13 and 14 structuring the drive magnet part 11 are different from the magnetic poles formed on opposite faces of two other drive magnet pieces 13 and 14 which are adjacent to each other in the circumferential direction of the lens drive device 1. In other words, a magnetic pole formed at an intermediate position in the optical axis direction of the drive magnet part 11 is different from a magnetic pole formed at an intermediate position in the optical axis direction of another drive magnet part 11 which is adjacent to each other in the circumferential direction of the lens drive device 1.

For example, magnetic poles formed on the opposite faces of the drive magnet pieces 13 and 14 which are disposed on the right side and the left side in FIG. 6 are "S"-pole, and magnetic poles formed on the opposite faces of the drive magnet pieces 13 and 14 which are disposed on the upper side and the lower side in FIG. 6 are "N"-pole. Therefore, in the example shown in FIG. 6, the magnetic flux "F" is generated so as to go from spaces between the drive magnet pieces 13 and 14 disposed on the upper side and the lower side in FIG. 6 to spaces between the drive magnet pieces 13 and 14 disposed on the right side and the left side in FIG. 6.

In this embodiment, the magnetic poles which are formed on opposite faces of two drive magnet pieces 13 and 14 are different from the magnetic poles formed on opposite faces of other two drive magnet pieces 13 and 14 which are adjacent to each other in the circumferential direction. Therefore, winding directions of the drive coils 12 which are disposed around the drive magnet pieces 13 and 14 disposed on the upper side and the lower side in FIG. 6 are different from winding directions of the drive coils 12 which are disposed around the drive magnet pieces 13 and 14 disposed on the right side and the left side in FIG. 6.

As described above, in this embodiment, the substantially triangular prism-shaped drive magnet parts 11 and the substantially triangular tube-shaped drive coils 12 are disposed at four corners of the lens drive device 1 whose shape viewed in the optical axis direction is substantially square shape. Therefore, the drive magnet parts 11 and the drive coils 12 are disposed at four corners of the lens drive device 1 which are dead spaces of the lens drive device 1 for driving a lens whose shape viewed in the optical axis direction is substantially circular.

Further, in this embodiment, the inner peripheral face of the drive coil 12 which is wound around in a substantially triangular tube shape is oppositely disposed to the outer peripheral face of the drive magnet part 11 through a predetermined gap space, and the drive magnet part 11 is magnetized so that magnetic flux "F" passing through the drive coil 12 is generated at a position facing the drive coil 12. Therefore, a magnetic circuit for driving the movable body 2 is efficiently formed by utilizing the entire periphery of the drive magnet part 11 and by utilizing the entire periphery of the drive coil 12. Accordingly, even when the sizes of the drive magnet part 11 and the drive coil 12 are reduced, a required drive force for driving the movable body 2 can be obtained. In other words, while securing a drive force for driving the movable body 2, the sizes of the drive magnet part 11 and the drive coil 12 can be reduced.

As described above, in this embodiment, the sizes of the drive magnet part 11 and the drive coil 12 can be reduced and the drive magnet 11 and the drive coil 12 can be disposed at four corners of the lens drive device 1 which are dead spaces. Therefore, in this embodiment, even when a diameter of a lens which is mounted increases, the size of the lens drive device 1 can be reduced.

In this embodiment, opposite faces of two drive magnet pieces 13 and 14 which are disposed to superpose on each other in the optical axis direction are magnetized in the same magnetic pole as each other. Therefore, density of the magnetic flux "F" can be increased which passes through the drive coil 12 between the opposite faces of two drive magnet pieces 13 and 14. Accordingly, a magnetic circuit for driving the movable body 2 is efficiently formed and the drive magnet part 11 and the drive coil 12 can be further miniaturized.

In this embodiment, a predetermined gap space is formed between the drive magnet piece 13 and the drive magnet piece 14 in the optical axis direction. Therefore, even when dimensional accuracy of the drive magnet pieces 13 and 14 or the like in the optical axis direction is not excellent, a dimensional error in the optical axis direction of the drive magnet pieces 13 and 14 or the like can be absorbed with the gap space. In other words, the dimensional accuracy of the drive magnet pieces 13 and 14 or the like can be lowered and thus production cost of components such as the drive magnet pieces 13 and 14 can be reduced.

In this embodiment, four drive magnet parts 11 and four drive coils 12 are disposed on the inner peripheral side of the tube part 7b of the first case body 7 which is formed in a substantially rectangular tube shape. Further, in this embodiment, the end face on the object side of the drive magnet piece 13 is abutted with the opposite-to-object side face of the bottom part 7a, and the end face on the opposite-to-object side of the drive magnet piece 14 is abutted with the magnetic plate 15. Therefore, leakage of the magnetic flux "F" which is generated from the drive magnet part 11 is restrained to form an effective magnetic circuit.

Especially, in this embodiment, the magnetic poles formed on the opposite faces to each other of two drive magnet pieces 13 and 14 structuring the drive magnet part 11 are different from the magnetic poles formed on the opposite faces of other two drive magnet pieces 13 and 14 which are adjacent to each other in the circumferential direction of the lens drive device 1. For example, the magnetic flux "F" is generated which is directed from spaces between the drive magnet pieces 13 and 14 disposed on the upper side and the lower side in FIG. 6 toward spaces between the drive magnet pieces 13 and 14 disposed on the right side and the left side in FIG. 6. Therefore, even when a magnetic member (yoke) is not disposed on the inner side of the drive magnet part 11 in a radial direction of the lens drive device 1, effective magnetic circuits can be formed between the drive magnet parts 11 which are adjacent to each other in the circumferential direction of the lens drive device 1.

In this embodiment, the width "H" in the optical axis direction of the drive coil 12 is set to be not less than the sum of the distance "D" between the opposite faces of the drive magnet pieces 13 and 14 facing in the optical axis direction and the moving distance of the movable body 2. Therefore, density of the magnetic flux "F" passing through the drive coil 12 can be made uniform at any position in the optical axis direction within a moving range of the movable body 2. Accordingly, a drive force for the movable body 2 can be stabilized within the moving range of the movable body 2.

In this embodiment, the drive coils 12 are fixed on the outer peripheral face of the small diameter part 6a of the sleeve 6. Therefore, in comparison with a case that the drive coils 12 are fixed on the outer peripheral face of the large diameter part 6b, the drive magnet parts 11 can be disposed at positions further nearer to the sleeve 6. Accordingly, the lens drive device 1 can be further made smaller.

In this embodiment, four drive coils 12 are formed by using one conducting wire which is wound around successively. Therefore, the number of terminals for power supply for supplying an electric current to four drive coils 12 is reduced and thus the structure of the lens drive device 1 is simplified.

Although the present invention has been shown and described with reference to a specific embodiment, various changes and modifications will be apparent to those skilled in the art from the teachings herein.

Figure 7:
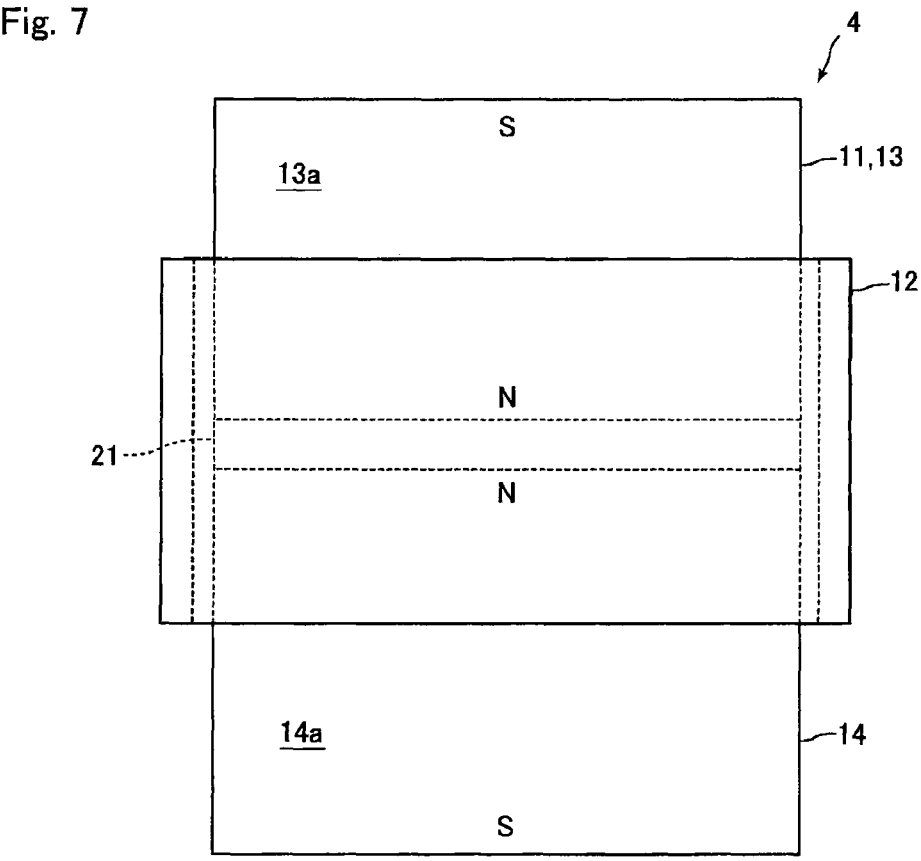
FIG. 7 is a side view showing another drive magnet part in accordance with an embodiment of the present invention.

In the embodiment described above, a gap space is formed between the opposite faces of the drive magnet pieces 13 and 14. However, the present invention is not limited to this embodiment. For example, the opposite faces of the drive magnet pieces 13 and 14 may be abutted with each other. Further, as shown in FIG. 7, a magnetic plate 21 made of magnetic material may be disposed between the drive magnet piece 13 and the drive magnet piece 14 in the optical axis direction. According to examinations of the present inventors, when the magnetic plate 21 is disposed between the drive magnet pieces 13 and 14, density of the magnetic flux "F" passing through the drive coil 12 is effectively increased in comparison with a case that a gap space is formed between the drive magnet pieces 13 and 14. In this case, for example, the opposite faces of the drive magnet pieces 13 and 14 are abutted with the magnetic plate 21. Further, the magnetic plate 21 is formed of a flat plate whose shape viewed in the optical axis direction is substantially rectangular equilateral triangle.

Figure 8:
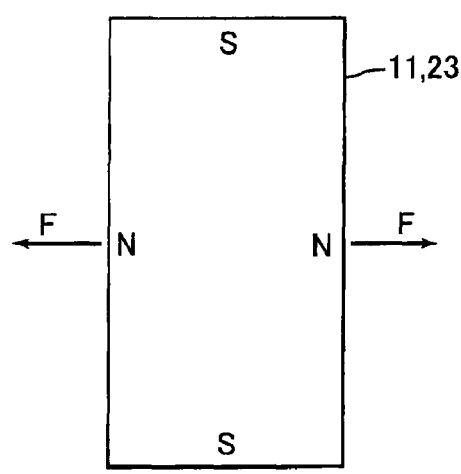
FIG. 8 is a side view showing another drive magnet part in accordance with an embodiment of the present invention.

In the embodiment described above, the drive magnet part 11 is structured of two drive magnet pieces 13 and 14. However, the present invention is not limited to this embodiment. For example, as shown in FIG. 8, the drive magnet part 11 may be structured of one drive magnet piece 23. In this case, as shown in FIG. 8, the drive magnet piece 23 is magnetized so that magnetic poles formed at both ends in the optical axis direction are different from a magnetic pole formed at an intermediate position in the optical axis direction. In other words, the drive magnet piece 23 is magnetized so that the magnetic flux "F" passing through the drive coil 12 is generated at a position facing the drive coil 12. In this case, the lens drive device 1 is easily assembled. Further, in this case, rigidity of the lens drive device 1 can be enhanced.

In the embodiment described above, the drive magnet parts 11 and the drive coils 12 are disposed at four corners of the lens drive device 1. However, the present invention is not limited to this embodiment. For example, when a drive force for the movable body 2 can be satisfactorily obtained, the drive magnet parts 11 and the drive coils 12 may be disposed at three, two or one position of four corners of the lens drive device 1. In this case, a guide shaft for guiding the movable body 2 in the optical axis direction may be disposed at a corner portion of the lens drive device 1 where the drive magnet part 11 and the drive coil 12 are not disposed, and an engaging recessed part engaged with the guide shaft may be formed on the sleeve 6.

In the embodiment described above, four drive coils 12 are formed by using one coil wire which is wound around successively. However, the present invention is not limited to this embodiment. For example, four drive coils 12 may be formed by using four coil wires which are respectively wound around. In other words, one drive coil 12 is individually formed by using one conducting wire. In this case, individual electric currents are supplied to four drive coils 12. Therefore, according to this structure, inclination with respect to the optical axis "L" of a lens which is held by the movable body 2 can be corrected in any direction by controlling directions of electric currents and current values supplied to four drive coils 12. Further, when a sensor for shake detection is mounted on the lens drive device 1 or a camera on which the lens drive device 1 is mounted, shake correction can be performed by utilizing an output signal from the sensor to control directions of electric currents and current values supplied to four drive coils 12.

In accordance with an embodiment of the present invention, in order to simplify a control circuit for supplying an electric current to the drive coils 12 and to simplify a supplying control of an electric current to the drive coils 12, instead of individually supplying an electric current to four drive coils 12, it may be structured that two drive coils 12 are set to be a pair and an electric current is supplied to two pairs of the drive coils 12 individually. In this case, two drive coils 12 disposed in a point-symmetrical manner with respect to the optical axis "L" may be connected with each other so that two drive coils 12 disposed in a point-symmetrical manner with respect to the optical axis "L" are set to be a pair. Alternatively, two drive coils 12 adjacent to each other in the circumferential direction of the lens drive device 1 may be connected with each other so that two drive coils 12 adjacent to each other in the circumferential direction of the lens drive device 1 are set to be a pair.

When two drive coils 12 disposed in a point-symmetrical manner with respect to the optical axis "L" are connected, inclination of a lens with respect to the optical axis "L" can be corrected in two directions perpendicular to each other. Therefore, when corrections in two directions are combined, inclination of the lens with respect to the optical axis "L" can be corrected in all directions. Further, when two drive coils 12 adjacent to each other in the circumferential direction of the lens drive device 1 are connected (for example, the drive coil 12 disposed on the left side in FIG. 3 and the drive coil 12 disposed on the lower side are connected, and the drive coil 12 disposed on the right side in FIG. 3 and the drive coil 12 disposed on the upper side are connected), inclination of the lens with respect to the optical axis "L" can be corrected in one direction. In this case, in order to obtain a stable characteristic, it is preferable that an attitude of the lens drive device 1 when mounted on a camera is considered and a direction required to correct inclination of a lens is set to be matched with an inclination correcting direction of the lens.

In the embodiment described above, a plurality of lenses are fixed to the inner peripheral side of the lens holder 5 which is held by the sleeve 6. However, the present invention is not limited to this embodiment. For example, a plurality of lenses may be directly fixed to the inner peripheral face of the sleeve 6. In the lens drive device in which a drive coil is wound around an outer periphery of the sleeve as described in the above-mentioned Patent Reference, it is difficult that a sleeve to which a lens has been fixed to its inner peripheral side is set in a coil winding machine to wind a drive coil around the sleeve. However, in this embodiment, the drive coil 12 wound around in an air-core shape can be easily stuck on the outer peripheral face of the sleeve 6 after a lens has been fixed to the inner peripheral side of the sleeve 6.

In the embodiment described above, the width "H" of the drive coil 12 in the optical axis direction is set to be not less than the sum of the distance "D" between the opposite faces of the drive magnet pieces 13 and 14 facing in the optical axis direction and the moving distance of the movable body 2. However, the present invention is not limited to this embodiment. For example, when a drive force for the movable body 2 can be obtained, the width "H" of the drive coil 12 may be smaller than the sum of the distance "D" between the opposite faces of the drive magnet pieces 13 and 14 facing in the optical axis direction and the moving distance of the movable body 2.

In the embodiment described above, the magnetic poles formed on the opposite faces of two drive magnet pieces 13 and 14 which structure the drive magnet part 11 are different from the magnetic poles formed on the opposite faces of other two drive magnet pieces 13 and 14 which are adjacent to each other in the circumferential direction of the lens drive device 1. However, the present invention is not limited to this embodiment. For example, the magnetic poles formed on the opposite faces of two drive magnet pieces 13 and 14 may be the same as the magnetic poles formed on the opposite faces of other drive magnet pieces 13 and 14 which are adjacent to each other in the circumferential direction.

In the embodiment described above, the sleeve 6 is formed in a substantially cylindrical stepped shape but the sleeve 6 may be formed in a substantially cylindrical shape without a stepped portion. Further, in the embodiment described above, the drive coils 12 are fixed to the movable body 2 and the drive magnet parts 11 are fixed to the fixed body 3. However, it may be structured that the drive magnet parts 11 are fixed to the movable body 2 and the drive coils 12 are fixed to the fixed body 3.

Next, a lens drive device in accordance with an embodiment of the present invention which is provided with a flat spring capable of restraining damage and excessive deformation caused by impact even when the lens drive device is made smaller and thinner will be described below with reference to the accompanying drawings.

Figure 9:
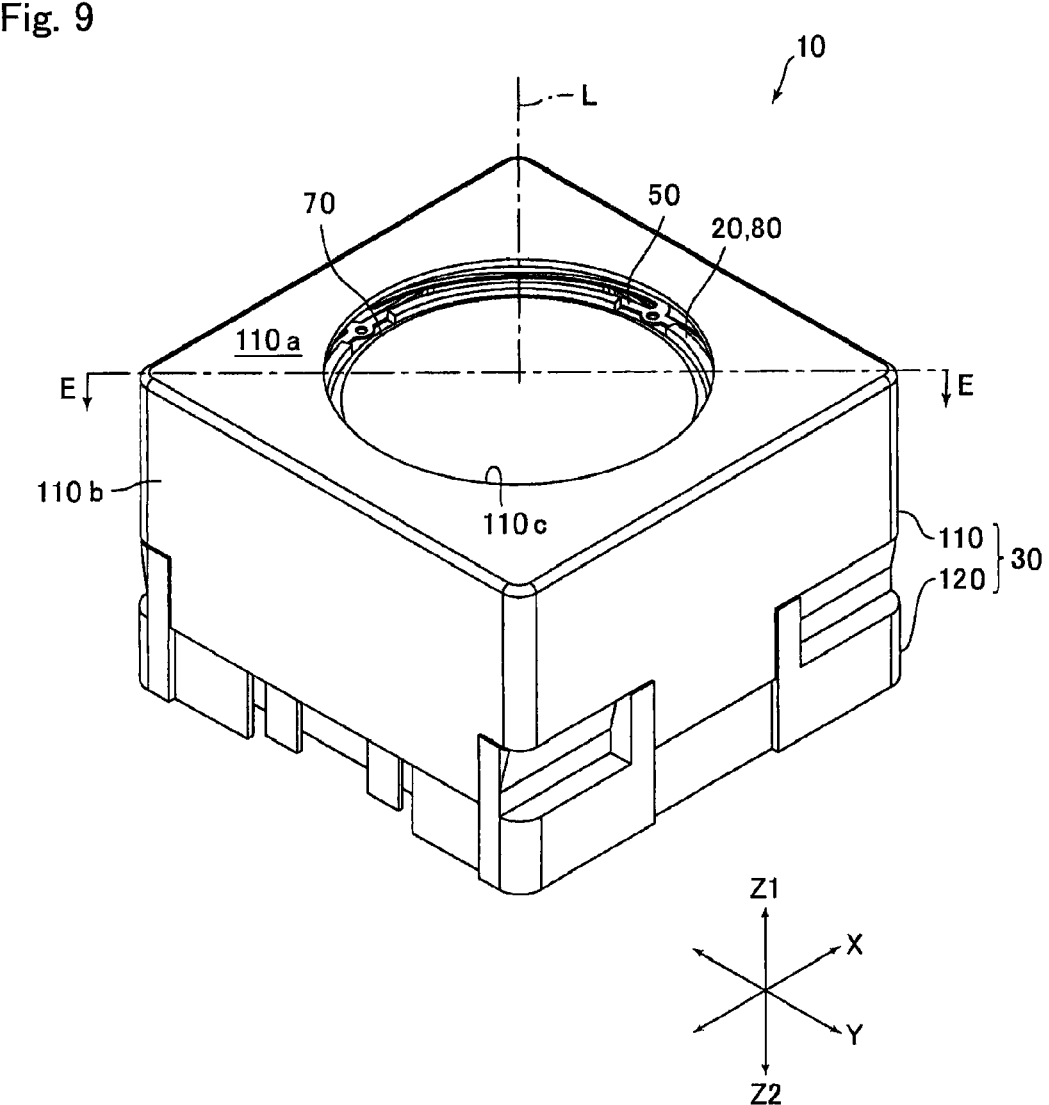
FIG. 9 is a perspective view showing a lens drive device in accordance with another embodiment of the present invention.
Figure 10:
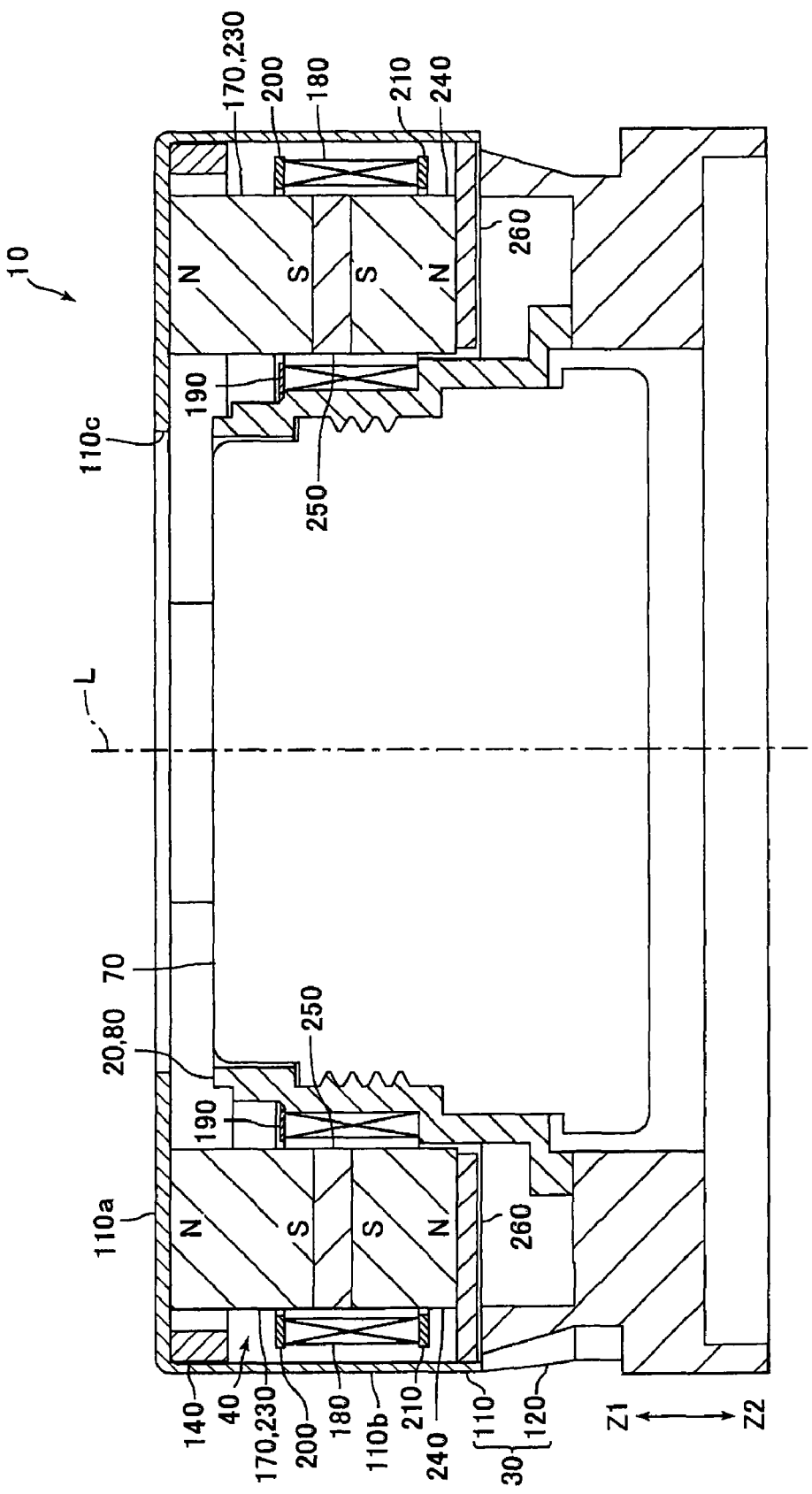
FIG. 10 is a cross-sectional view showing the lens drive device which is cut by the line "E-E" in FIG. 9.
Figure 11:
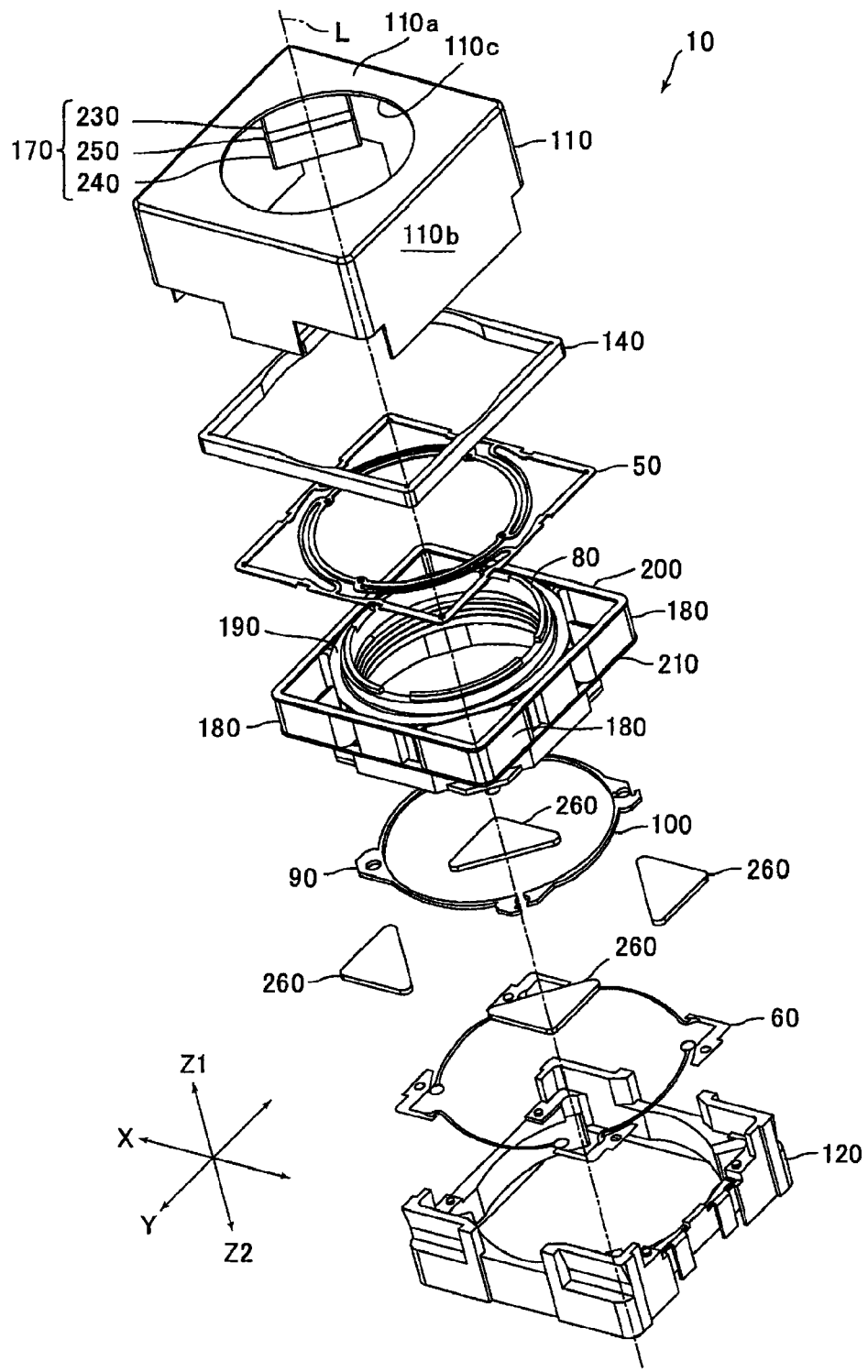
FIG. 11 is an exploded perspective view showing the lens drive device in FIG. 9.
Figure 12:
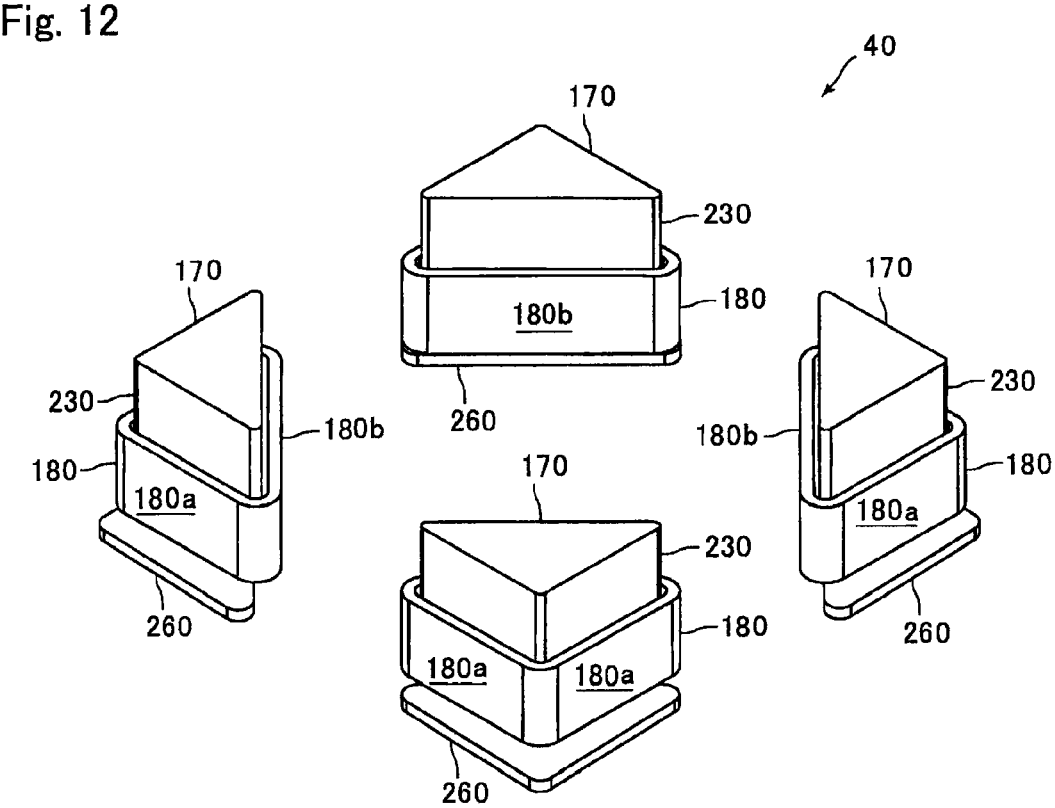
FIG. 12 is a perspective view showing an arrangement relationship of drive magnet parts and drive coils shown in FIG. 10.
Figure 13:
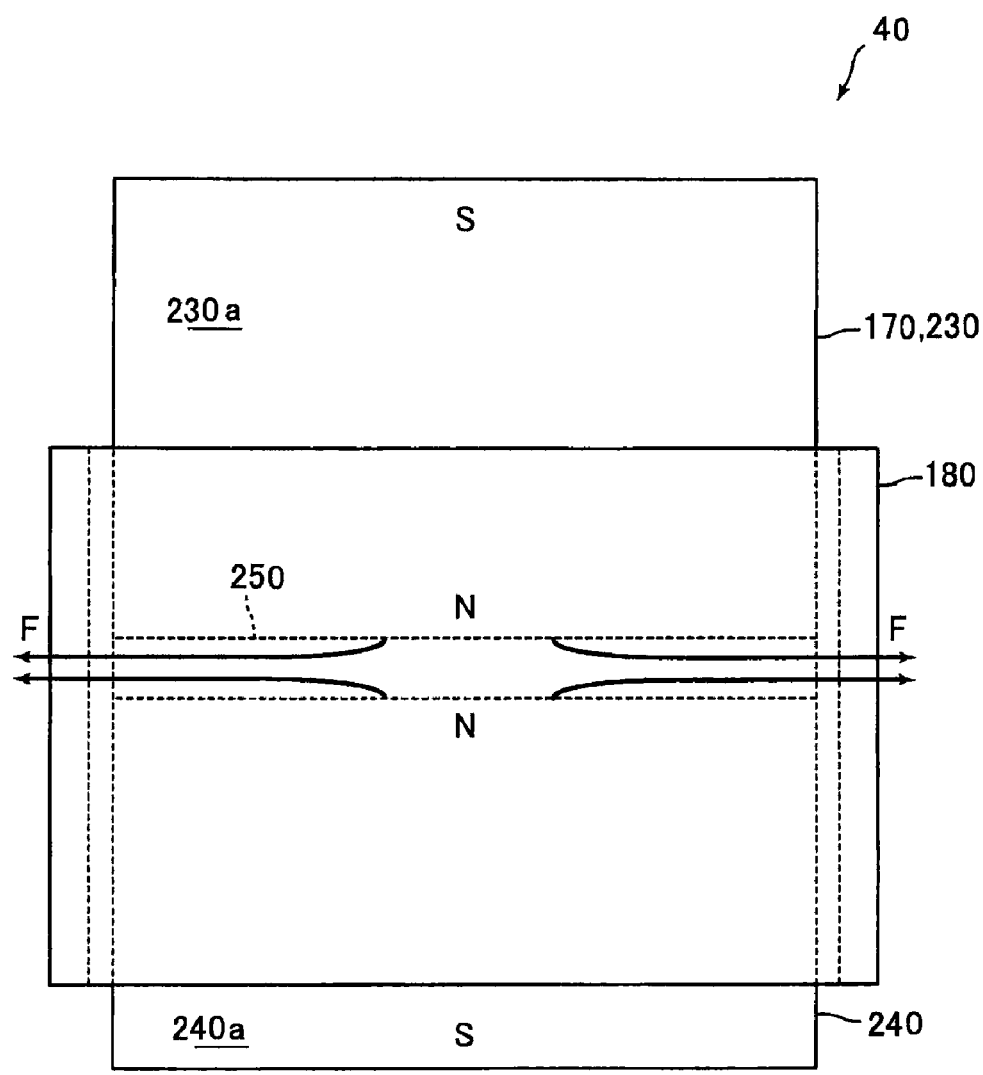
FIG. 13 is a side view showing the drive magnet part and the drive coil in FIG. 12.
Figure 14:
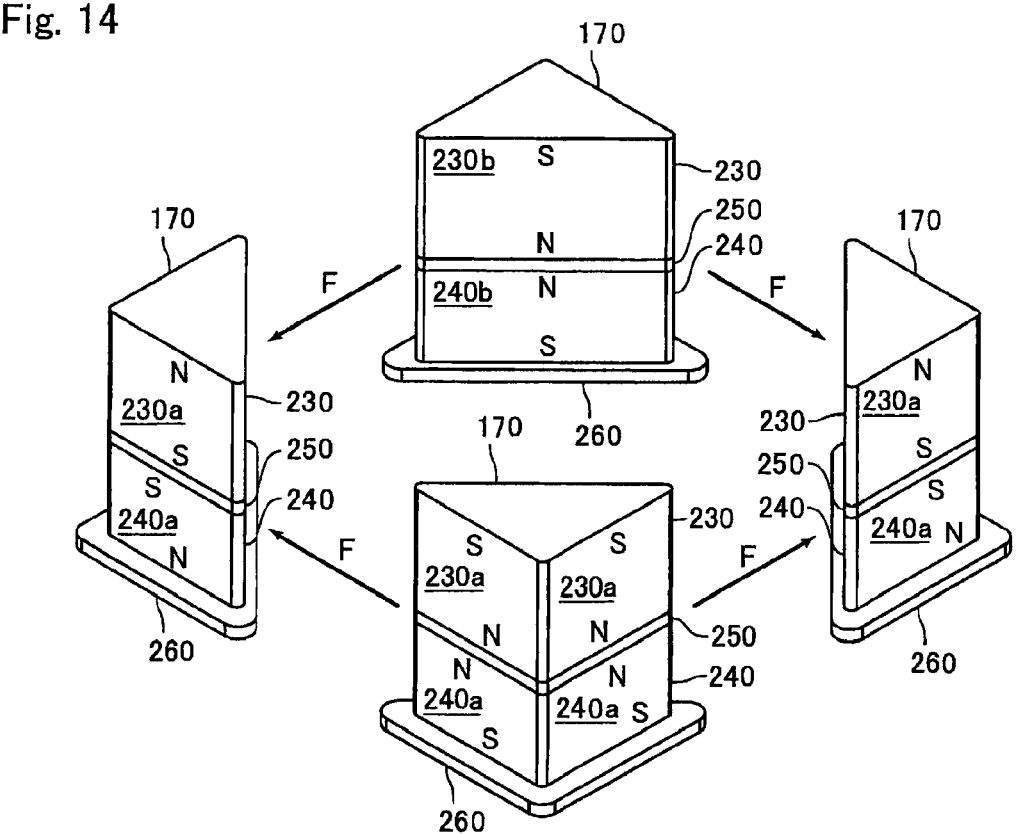
FIG. 14 is an explanatory perspective view showing magnetized states of the drive magnet parts which are disposed at four corners of the lens drive device shown in FIG. 9.

FIG. 9 is a perspective view showing a lens drive device 10 in accordance with an embodiment of the invention. FIG. 10 is a cross-sectional view showing the lens drive device 10 which is cut by the line "E-E" in FIG. 9. FIG. 11 is an exploded perspective view showing the lens drive device 10 in FIG. 9. FIG. 12 is a perspective view showing an arrangement relationship of drive magnet parts 170 and drive coils 180 which are shown in FIG. 10. FIG. 13 is a side view showing the drive magnet part 170 and the drive coil 180 in FIG. 12. FIG. 14 is an explanatory view showing magnetized states of the drive magnet parts 170 which are disposed at four corners of the lens drive device 10 in FIG. 9.

A lens drive device 10 in this embodiment is a device which is mounted on a relatively small camera used in a cellular phone or the like. The lens drive device 10 is, similarly to the lens drive device 1 shown in FIG. 1, generally formed in a substantially quadratic prism shape. In the following descriptions, the "Z1" direction side is set to be an object to be photographed side, the "Z2" direction side is set to be an opposite-to-object side (imaging element side), and two directions perpendicular to the optical axis "L" and perpendicular to each other are set to be the "X" direction and the "Y" direction. In this embodiment, four side faces of the lens drive device 10 are parallel to the "X" direction or the "Y" direction.

The lens drive device 10 includes, as shown in FIGS. 9 and 10, a movable body 20 which holds a lens for photography and which is movable in the optical axis direction, a fixed body 30 which holds the movable body 20 movably in the optical axis direction, and a drive mechanism 40 for driving the movable body 20 in the optical axis direction. The movable body 20 is movably held by the fixed body 30 through two flat springs 50 and 60 (see FIG. 11). The flat springs 50 and 60 are not shown in FIG. 10.

The movable body 20 includes a sleeve 80 which holds a lens holder 70 to which a plurality of lenses are fixed, and coil end fixing members 90 and 100 to which end parts of the drive coils 180 structuring the drive mechanism 40 are electrically connected and fixed by soldering or the like. The coil end fixing members 90 and 100 are not shown in FIG. 10 and the lens holder 70 is not shown in FIG. 11.

The lens holder 70 is formed in a substantially cylindrical shape and a plurality of lenses are fixed on its inner peripheral side. The sleeve 80 holds the lens holder 70 on its inner peripheral side, and a female screw which engages with a male screw formed on an outer peripheral face of the lens holder 70 is formed on an inner peripheral face of the sleeve 80. Further, in this embodiment, an outer diameter on the object to be photographed side of the lens holder 70 is set to be smaller than an outer diameter on its opposite-to-object side, and an outer diameter on the object side of the sleeve 80 is also set to be smaller than an outer diameter on its opposite-to-object side.

The coil end fixing member 90 and 100 are formed of metal material having electro-conductivity. The coil end fixing members 90 and 100 are fixed to an end face on the opposite-to-object side of the sleeve 80.

The fixed body 30 includes a first case body 110 which is disposed on the object to be photographed side and a second case body 120 which is disposed on the opposite-to-object side.

The first case body 110 is formed of magnetic material and is formed in a substantially rectangular bottomed tube shape which is provided with a bottom part 110a and a tube part 110b. A center of the bottom part 110a disposed on the object to be photographed side is formed with a circular through hole 110c. The first case body 110 is disposed to surround the outer peripheral side of the movable body 20 and the drive mechanism 40 to structure a side face of the lens drive device 10.

The second case body 120 is formed, for example, of resin material and is formed in a substantially rectangular tube shape. The second case body 120 is attached to the opposite-to-object side of the first case body 110 so as to surround the outer peripheral side on the opposite-to-object side of the lens holder 70.

The flat spring 50 is disposed on the object to be photographed side of the movable body 20. A detailed structure of the flat spring 50 will be described below.

The flat spring 60 is structured of a sleeve fixed part which is fixed to the sleeve 80, a case body fixed part which is fixed to the second case body 120, and arm parts which connect the sleeve fixed part with the case body fixed part. The flat spring 60 is disposed on the opposite-to-object side of the movable body 20. The sleeve fixed part is fixed to the end face on the opposite-to-object side of the sleeve 80 through the coil end fixing members 90 and 100. In other words, the sleeve fixed part is fixed to the coil end fixing members 90 and 100. The case body fixed part is fixed to a fixing face formed on the object side of the second case body 120.

As shown in FIGS. 10 through 12, the drive mechanism 40 includes four substantially triangular prism-shaped drive magnet parts 170, which are disposed at four corners of the lens drive device 10 (specifically, four corners on an inner side of the first case body 110), and four drive coils 180 which are wound around in a substantially triangular tube shape and whose inner peripheral sides are oppositely disposed to outer peripheral faces of the drive magnet parts 170 through a predetermined gap space. Further, the drive mechanism 40 includes a magnetic member 190, which is fixed to the end faces on the object side of the drive coils 180 and is attracted toward a portion between the drive magnet pieces 230 and 240 structuring the drive magnet part 170, and coil protection members 200 and 210 for protecting the drive coils 180 which are attached on the object side and the opposite-to-object side of the drive coils 180.

The drive magnet part 170 includes two substantially triangular prism-shaped drive magnet pieces 230 and 240, which are disposed to superpose on each other in the optical axis direction, and a magnetic plate 250 which is disposed between the drive magnet pieces 230 and 240. An end face on the opposite-to-object side of the drive magnet piece 230 is fixed to a face on the object side of the magnetic plate 250 and an end face on the object side of the drive magnet piece 240 is fixed to a face on the opposite-to-object side of the magnetic plate 250.

The drive magnet pieces 230 and 240 are formed so that their shapes viewed in the optical axis direction are a substantially rectangular equilateral triangle. As shown in FIG. 14, the drive magnet pieces 230 and 240 are provided with two rectangular flat parts 230a and 240a, which are substantially parallel to the optical axis "L" and perpendicular to each other, and rectangular slant face parts 230b and 240b which are substantially parallel to the optical axis "L" for connecting two flat parts 230a and 240a.

The drive magnet pieces 230 and 240 are disposed so that an inner peripheral face of the tube part 110b of the first case body 110 is substantially parallel to the flat parts 230a and 240a. In other words, two drive magnet pieces 230 and 240 which are disposed at diagonal positions on the inner side of the first case body 110 are disposed so that the slant face parts 230b and 240b are faced each other. Further, the drive magnet pieces 230 are fixed to the bottom part 110a of the first case body 110. Specifically, end faces on the object side of the drive magnet pieces 230 are fixed to the face on the opposite-to-object side of the bottom part 110a. Further, the end faces on the object side of the drive magnet pieces 230 are abutted with the face on the opposite-to-object side of the bottom part 110a.

The magnetic plate 250 is formed of magnetic material. The magnetic plate 250 is formed in a flat plate shape so that its shape viewed in the optical axis direction is substantially rectangular equilateral triangle similarly to the drive magnet pieces 230 and 240.

An end face on the opposite-to-object side of the drive magnet piece 240 is fixed with a flat plate-shaped magnetic plate 260 which is formed of magnetic material. The magnetic plate 260 is formed so that its shape viewed in the optical axis direction is a substantially rectangular equilateral triangle. Further, the magnetic plate 260 is abutted with the inner peripheral face of the tube part 110b of the first case body 110.

The drive coil 180 is formed so that its shape viewed in the optical axis direction is a substantially rectangular equilateral triangle. As shown in FIG. 12, the drive coil 180 is provided with two perpendicular face parts 180a, which are formed in a rectangular shape, substantially parallel to the optical axis "L" and perpendicular to each other, and a rectangular slant face part 180b which is substantially parallel to the optical axis "L" and connects two perpendicular face parts 180a.

Four drive coils 180 are fixed to the outer peripheral face of the sleeve 80. Specifically, four drive coils 180 are fixed to the outer peripheral face of the sleeve 80 with a substantially 90° pitch so that the inner peripheral face of the drive coil 180 and the outer peripheral face of the drive magnet part 170 are substantially parallel to each other through a predetermined gap space. The drive coils 180 are disposed at four corners on the inner side of the first case body 110. In this embodiment, the drive coils 180 are disposed at four corners on the inner side of the first case body 110 in a state that a predetermined gap space is maintained between the inner peripheral face of the first case body 110 and the drive coils 180. Therefore, the drive coils 180 are movable in the optical axis direction together with the sleeve 80.

As shown in FIGS. 13 and 14, two drive magnet pieces 230 and 240 structuring the drive magnet part 170 are disposed so that the same magnetic poles ("S"-pole and "S"-pole, or "N"-pole and "N"-pole) are faced each other in the optical axis direction. Therefore, the magnetic flux "F" passing through the perpendicular face parts 180a and the slant face part 180b of the drive coil 180 is generated between the drive magnet pieces 230 and 240.

Further, as shown in FIG. 14, magnetic poles formed on the opposite faces to each other of two drive magnet pieces 230 and 240 structuring the drive magnet part 170 are different from magnetic poles formed on the opposite faces of two other drive magnet pieces 230 and 240 which are adjacent in the circumferential direction of the lens drive device 10. For example, the magnetic poles formed on the opposite faces to each other of the drive magnet pieces 230 and 240, which are disposed on the right side and the left side in FIG. 14 are "S"-poles, and the magnetic poles formed on the opposite faces to each other of the drive magnet pieces 230 and 240 which are disposed on the upper side and the lower side in FIG. 14 are "N"-poles. Therefore, the magnetic flux "F" is generated from spaces between the drive magnet pieces 230 and 240 disposed on the upper side and the lower side in FIG. 14 toward spaces of the drive magnet pieces 230 and 240 disposed on the right side and the left side in FIG. 14.

Figure 15:
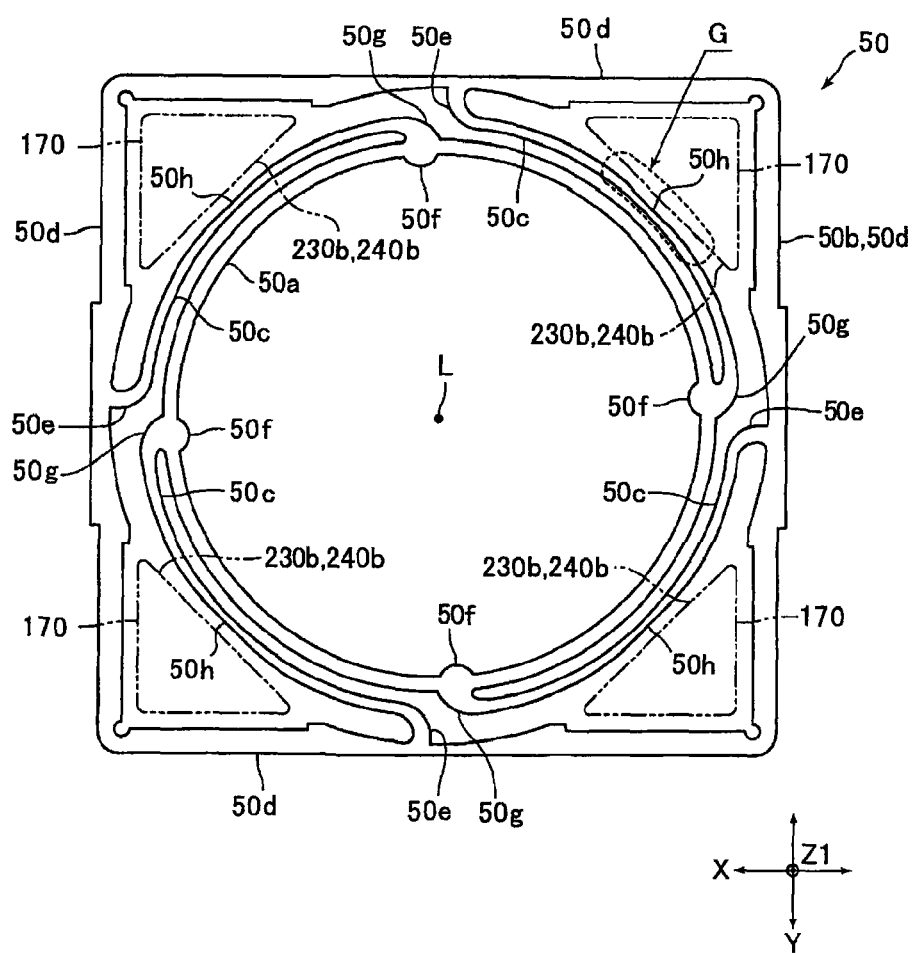
FIG. 15 is a plan view showing a flat spring in FIG. 11.
Figure 16:
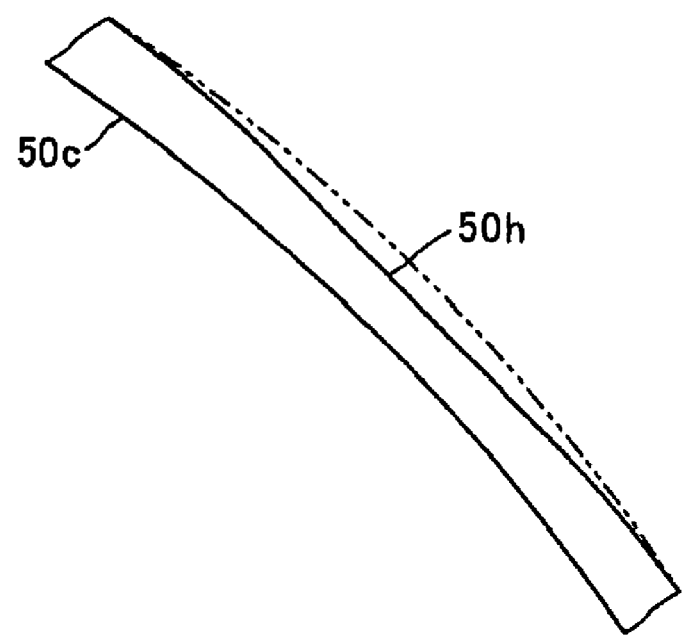
FIG. 16 is an enlarged plan view showing the "G" portion of the flat spring in FIG. 15.

FIG. 15 is a plan view showing the flat spring 50 in FIG. 11. FIG. 16 is an enlarged view showing the "G" portion of the flat spring 50 in FIG. 15.

The flat spring 50 is provided with a movable body fixed part 50a which is fixed to the movable body 20, a fixed body fixed part 50b which is fixed to the fixed body 30, and four arm parts 50c which connect the movable body fixed part 50a with the fixed body fixed part 50b. The flat spring 50 in this embodiment is formed by etching or press working and the entire thickness of the flat spring 50 is substantially constant.

The fixed body fixed part 50b is formed in a substantially rectangular frame shape. Specifically, the fixed body fixed part 50b is formed in a substantially square frame shape and is structured of four straight side parts 50d. The fixed body fixed part 50b is fixed to a face on the opposite-to-object side of the bottom part 110a of the first case body 110 through a spacer 140 (see FIG. 11) which is formed in a substantially square frame shape. In other words, the fixed body fixed part 50b is fixed to the spacer 140 which is fixed to the face on the opposite-to-object side of the bottom part 110a. Further, the fixed body fixed part 50b is fixed to the first case body 110 so that the straight side parts 50d are substantially parallel to the "X" direction or the "Y" direction. The fixed body fixed part 50b is disposed along the inner peripheral face of the tube part 110b of the first case body 110.

First connection parts 50e which are connected portions of the fixed body fixed part 50b with the arm parts 50c are formed at substantially intermediate positions of the straight side parts 50d. The first connection parts 50e are formed from the substantially intermediate positions of the straight side parts 50d toward the inner sides in the "X" direction or the inner sides in the "Y" direction. Further, the first connection part 50e is formed in a substantially one-quarter circular arc shape with a small radius of curvature.

The movable body fixed part 50a is formed in a substantially ring shape (substantially circular frame shape) and is disposed in the inner side of the fixed body fixed part 50b. The movable body fixed part 50a is fixed to the end face on the object side of the sleeve 80. Specifically, as shown in FIG. 15, sleeve fixed parts 50f are formed at both ends in the "X" direction and both ends in the "Y" direction of the movable body fixed part 50a and the sleeve fixed parts 50f are fixed to the end face on the object side of the sleeve 80. The sleeve fixed part 50f is formed in a substantially semicircular plate shape and is formed to protrude toward the inner peripheral side of the movable body fixed part 50a.

Second connection parts 50g which are connected portions of the movable body fixed part 50a with the arm parts 50c are formed at both ends in the "X" direction and both ends in the "Y" direction of the movable body fixed part 50a. The second connection parts 50g are formed from both ends in the "X" direction or both ends in the "Y" direction of the movable body fixed part 50a toward the outer sides in the "X" direction or the outer sides in the "Y" direction. In other words, the second connection parts 50g are located at substantially intermediate positions in the "Y" direction of the movable body fixed part 50a or at substantially intermediate positions in the "X" direction. This means that the second connection parts 50g are located at substantially intermediate positions of the straight side parts 50d of the fixed body fixed part 50b. Therefore, the arm part 50c is formed in a substantially circular arc shape between two substantially intermediate positions of the straight side parts 50d adjacent to each other. Further, the second connection part 50g is formed in a substantially one-quarter circular arc shape with a small radius of curvature.

The arm part 50c is formed in a substantially circular arc shape. Specifically, the arm part 50c is formed in a substantially one-quarter circular arc shape with the optical axis "L" as substantially a center. Four arm parts 50c are disposed with a substantially equal angular pitch around the optical axis "L". In other words, the four arm parts 50c are disposed with a substantially 90° pitch around the optical axis "L". For example, in FIG. 15, the arm parts 50c are disposed between the first connection part 50e disposed on the left end side and the second connection part 50g disposed on the upper end side, between the first connection part 50e disposed on the upper end side and the second connection part 50g disposed on the right end side, between the first connection part 50e disposed on the right end side and the second connection part 50g disposed on the lower end side, and between the first connection part 50e disposed on the lower end side and the second connection part 50g disposed on the left end side. Further, the arm parts 50c are formed along the outer peripheral face on the object side of the sleeve 80 which is formed in a substantially cylindrical shape.

A width in the radial direction of the arm part 50c is substantially constant as a whole. However, a width in the radial direction of an intermediate portion (substantially center portion) in the circumferential direction of the arm part 50c is made smoothly and gradually narrower than other portion of the arm part 50c. Specifically, the intermediate portion in the circumferential direction of the arm part 50c is, as shown in FIG. 16, gradually recessed and made thinner from the outer peripheral side toward the inner peripheral side of the arm part 50c, and a width of the recessed portion is made narrower than a width in the radial direction of other portion of the arm part 50c. In this embodiment, the intermediate portion in the circumferential direction of the arm part 50c whose width in the radial direction is made narrower than the other portion is a low spring constant part 50h whose spring constant is smaller than the other portion of the arm part 50c. In other words, in this embodiment, the low spring constant part 50h is formed at one position of the intermediate portion in the circumferential direction of the arm part 50c.

As described above, four arm parts 50c are disposed with a substantially equal angular pitch around the optical axis "L". Therefore, four low spring constant parts 50h are disposed with a substantially equal angular pitch around the optical axis "L". In other words, four low spring constant parts 50h are disposed with a substantially 90° pitch around the optical axis "L". Further, the low spring constant parts 50h are disposed on substantially diagonal lines of the lens drive device 1 which is formed in a substantially quadrangular prism shape.

As shown in FIG. 15, the drive magnet part 170 is disposed on the inner side of the fixed body fixed part 50b. Further, the drive magnet part 170 is disposed on the outer side in the radial direction of the arm part 50c. In this embodiment, when viewed in the optical axis direction, the first connection part 50e of the arm part 50c is located at a substantially intermediate position of the straight side part 50d and its second connection part 50g is located at a substantially intermediate position of the adjacent straight side part 50d so that the slant face part 230b of the drive magnet piece 230 is located between the first connection part 50e and the second connection part 50g. Therefore, the intermediate portion in the circumferential direction of the arm part 50c is located at a position facing the slant face part 230b of the drive magnet piece 230. Therefore, when an outer peripheral portion in the radial direction of the arm part 50c is linearly cut off at the position where the outer peripheral portion faces the slant face part 230b of the drive magnet piece 230 so as to be parallel to the slant face part 230b of the drive magnet piece 230, the linearly cut portion is formed in a gradually narrower shape toward the inner side and the low spring constant part 50h is formed at the intermediate portion in the circumferential direction of the arm part 50c. Further, when the outer portion in the radial direction of the arm part 50c is cut off linearly, a space between the slant face part 230b of the drive magnet part 170 and the arm part 50c is widened through the low spring constant part 50h and thus their interference is also prevented.

When it is difficult that the outer peripheral straight shape of the low spring constant part 50h and the slant face part 230b of the drive magnet piece 230 are set in parallel to each other, the outer peripheral straight shape of the low spring constant part 50h may be formed so as to be perpendicular to the radial direction (direction to the optical axis "L" in FIG. 15) of the arm part 50c which is a circular arc shape. In this case, when the straight shaped part of the low spring constant part 50h is disposed to face the slant face part 230b of the drive magnet piece 230, the outer peripheral straight shape of the low spring constant part 50h and the slant face part 230b of the drive magnet piece 230 may be set to be substantially parallel to each other.

In accordance with an embodiment of the present invention, in a case that an outer peripheral face of the low spring constant part 50h is formed in a substantially linear shape, the outer peripheral face may be simply cut linearly, the outer peripheral face is simply cut linearly and both end portions of the straight line shape may be formed in a gradually curved shape, or the outer peripheral face may be formed in a slightly curved shape or in a pseudo-straight shape.

In this embodiment, the drive magnet parts 170 are disposed on the outer sides in the radial direction of the arm parts 50c so that, when viewed in the optical axis direction, perpendicular bisectors of the slant face parts 230b of the drive magnet pieces 230 pass through substantially center positions of the respective low spring constant parts 50h in the circumferential direction.

In this embodiment, in order to restrain inclination of the movable body 20 with respect to the fixed body 30, the width of the first connection part 50e and the width of the second connection part 50g are set to be wider than the width of the arm part 5c. Further, in this embodiment, the flat spring 50 is fixed to the movable body 20 and the fixed body 30 so that an urging force toward the opposite-to-object side is generated to the movable body 20 when an electric current is not supplied to the drive coils 180.

As described above, in this embodiment, an intermediate portion in the circumferential direction of the arm part 50c structuring the flat spring 50 is formed to be the low spring constant part 50h whose spring constant is smaller than the other portion of the arm part 50c. Therefore, in this embodiment, even when the flat spring 50 is made smaller and thinner, damage or excessive deformation of the flat spring 50 due to impact or the like applied to the lens drive device 10 is restrained.

In other words, according to examinations of the present inventors, when the entire width of the arm part 50c is constant and the spring constant of the arm part 50c is constant, stress occurred in the flat spring 50 due to impact or the like is concentrated on the first connection part 50e and the second connection part 50g. Therefore, when the flat spring 50 is made smaller and thinner, damage or excessive deformation is easily occurred in the first connection part 50e and the second connection part 50g when an impact is applied to the lens drive device 10.

On the other hand, in this embodiment, the intermediate portion in the circumferential direction of the arm part 50c is formed to be the low spring constant part 50h and thus, when impact is applied to the lens drive device 10, stress is also concentrated on the low spring constant part 50h together with the first connection part 50e and the second connection part 50g. In other words, when the impact is applied to the lens drive device 10, stress occurred in the flat spring 50 is distributed to the first connection part 50e, the second connection part 50g and the low spring constant part 50h. Therefore, in this embodiment, stresses applied to the first connection part 50e and the second connection part 50g due to impact are reduced and, as a result, even when the flat spring 50 is made smaller and thinner, damage or excessive deformation of the flat spring 50 due to impact when the lens drive device 10 is dropped or the like is restrained.

Especially, in this embodiment, the low spring constant part 50h is formed in the intermediate portion in the circumferential direction of the arm part 50c. Therefore, the stresses occurred in the first connection part 50e and the second connection part 50g due to impact are reduced in a well balanced manner.

Figure 17A:
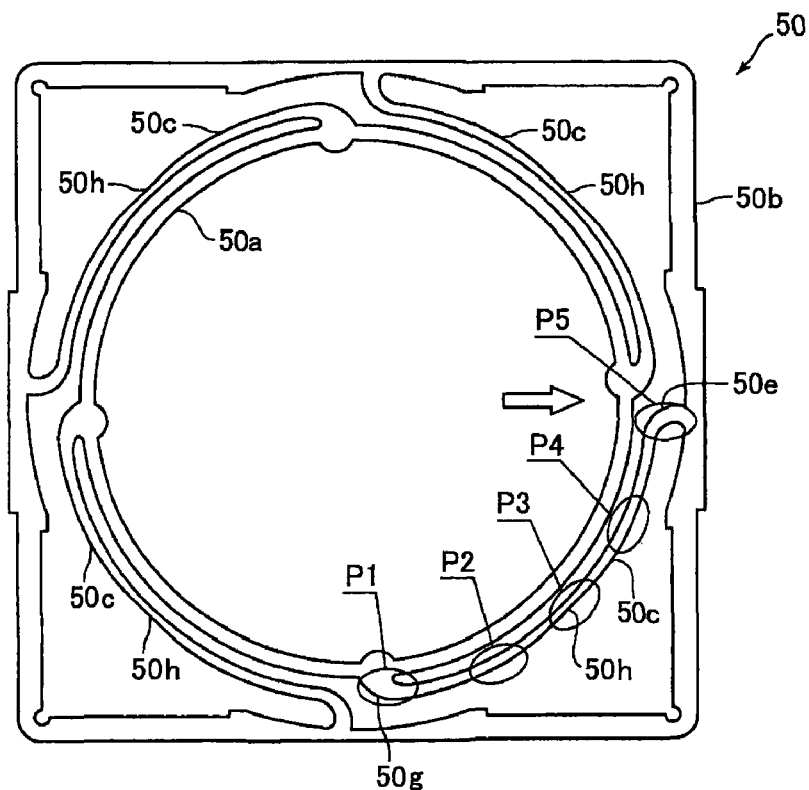
FIGS. 17(A) and 17(B) are plan views showing flat springs which are used to simulate an effect in the lens drive device shown in FIG. 9.
Figure 17B:
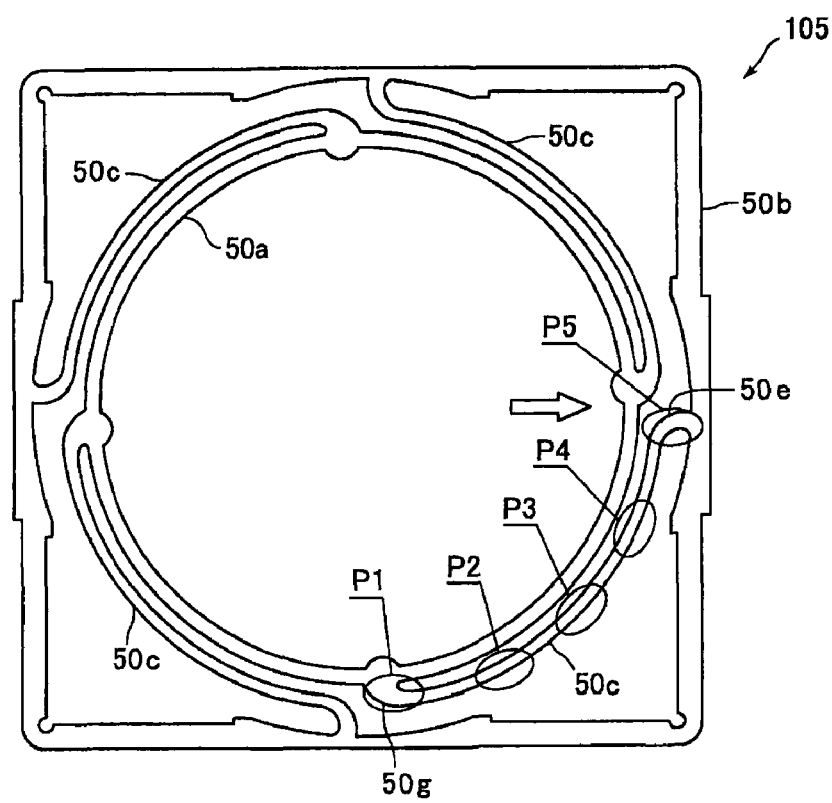

Effects in this embodiment will be described below on the basis of simulation results. Two kinds of flat springs 50 and 105 shown in FIGS. 17(A) and 17(B) are used and stresses occurred in the first connection part 50e, the second connection part 50g and the arm part 50c when the arm part 50c is deformed in the radial direction are calculated through simulations. The flat spring 50 shown in FIG. 17(A) is a flat spring in the embodiment of the present invention and the flat spring 105 shown in FIG. 17(B) is a flat spring in a comparison example. The flat spring 105 is formed to be the same as the flat spring 50 except that the entire width in the radial direction of the arm part 50c is substantially constant without being formed with the low spring constant part 50h in the arm part 50c. Therefore, the same notational symbols as the flat spring 50 are used in the same structural elements of the flat spring 105 in FIG. 17(B).

Material of the flat springs 50 and 105 used in the simulation is nickel copper alloy and its thickness is 0.06 mm. Further, the width of the arm part 50c except the low spring constant part 50h of the flat spring 50 and the width of the arm part 50c of the flat spring 105 which are used in the simulation are 0.13 mm, and the smallest width of the low spring constant part 5h is 0.093 mm. In addition, the radius of curvature of the arm parts 50c of the flat springs 50 and 105 used in the simulation is 3.87 mm.

In this simulation, stresses occurred at five points, i.e., calculation points "P1" through "P5" were calculated when the right side end of an inner circumference portion of the movable body fixed part 50a had been pushed to the right side direction (in other words, pushed toward the outer side in the radial direction) so that the right side end of the movable body fixed part 50a is forcibly deformed by 0.1 mm to the right side direction. As shown in FIGS. 17(A) and 17(B), the calculation point "P5" is the portion where the first connection part 50e is formed and the calculation point "P1" is the portion where the second connection part 50g is formed. Further, the calculation point "P3" is an intermediate position of the arm part 50c in the circumferential direction and, in the flat spring 50, the calculation point "P3" is the position where the low spring constant part 50h is formed. In addition, the calculation point "P2" is an intermediate position between the calculation point "P1" and the calculation point "P3" of the arm part 50c in the circumferential direction, and the calculation point "P4" is an intermediate position between the calculation point "P3" and the calculation point "P5" of the arm part 50c in the circumferential direction. In the simulation, maximum values of Mises stress of the respective calculation points "P1" through "P5" were calculated.

Figures 18A, 18B:
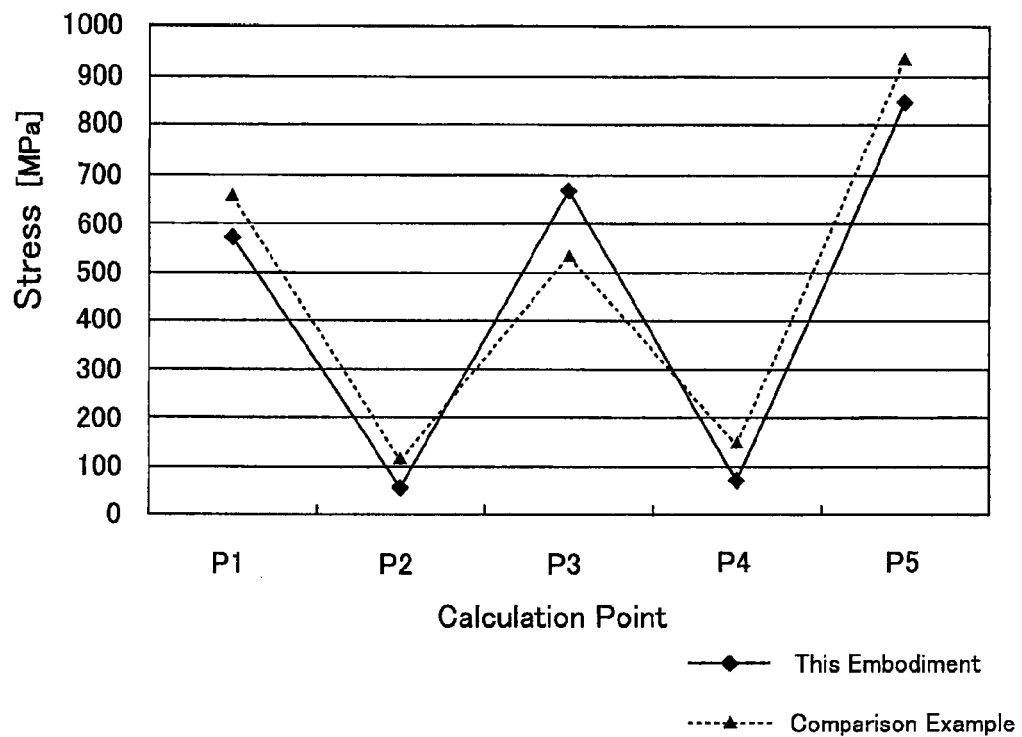
FIG. 18(A) is a graph showing simulated results for explaining an effect in the lens drive device shown in FIG. 9.
FIG. 18(B) is a table of original data for the graph shown in FIG. 18(A).

Simulation results are shown in FIGS. 18(A) and 18(B). As shown in FIG. 18(A), in the flat spring 50 in this embodiment, the stresses at the calculation points "P1" and "P5" are decreased and the stress at the calculation point "P3" is increased in comparison with the comparison example of the flat spring 105. In other words, in the flat spring 105, the stress occurred in the flat spring 105 is concentrated on the first connection part 50e and the second connection part 50g. However, in the flat spring 50, the stress occurred in the flat spring 50 are distributed to the first connection part 50e, the second connection part 50g and the low spring constant part 50h. Further, the maximum value of the stress occurred in the flat spring 50 becomes smaller than the maximum value of the stress occurred in the flat spring 105. As described above, in this embodiment, the stress occurred in the flat spring 50 is distributed to the first connection part 50e, the second connection part 50g and the low spring constant part 50h and thus the stresses to the first connection part 50e and the second connection part 50g due to impact are reduced. As a result, even when the flat spring 50 is made smaller or thinner, damage or excessive deformation of the flat spring 50 due to impact or the like applied to the lens drive device 10 is restrained.

Further, as shown in FIG. 18(A), the stresses at the calculation points "P1" and "P5" in the flat spring 50 in this embodiment are approximately equally decreased in comparison with the stresses at the calculation points "P1" and "P5" in the flat spring 105 in the comparison example. As described above, in this embodiment, the low spring constant part 50h is formed at the intermediate portion in the circumferential direction of the arm part 50c. Therefore, the stress in the first connection part 50e and the stress in the second connection part 50g which are occurred due to impact are reduced in a well balanced manner.

In this embodiment, mean values of the stresses at the calculation points "P1" through "P5" calculated in the simulation are 451(MPa) in the flat spring 50 and 481(MPa) in the flat spring 105. Further, differences between the maximum values and the minimum values of the stresses at the calculation points "P1" through "P5" calculated in the simulation are 788(MPa) in the flat spring 50 and 809(MPa) in the flat spring 105.

In this embodiment, four arm parts 50c are disposed with a substantially equal angular pitch with the optical axis "L" as the center and the low spring constant parts 50h are disposed with a substantially equal angular pitch with the optical axis "L" as the center. Therefore, even when a force due to impact is applied to the flat spring 50 in any direction, the stress occurred in the flat spring 50 can be distributed to the first connection part 50e, the second connection part 50g and the low spring constant part 50h in a well balanced manner.

In this embodiment, the width in the radial direction of the low spring constant part 50h is set to be narrower than the width in the radial direction of the other portion of the arm part 50c except the low spring constant part 50h. Therefore, even when the thickness of the entire flat spring 50 is uniform, the low spring constant part 50h is formed in the arm part 50c. Therefore, even when the low spring constant part 50h is formed in the arm part 50c, as described above, the flat spring 50 can be formed by etching process or press working. In other words, even when the low spring constant part 50h is to be formed in the arm part 50c, a smaller and thinner flat spring 50 can be relatively easily formed.

In this embodiment, the drive magnet part 170 is disposed on the outer side in the radial direction of the arm part 50c so that, when viewed in the optical axis direction, the perpendicular bisector of the slant face part 230b of the drive magnet piece 230 passes through the substantially center position of the low spring constant part 50h. Further, in the low spring constant part 50h, an outer peripheral face of the arm part 50c is recessed toward an inner peripheral side. Therefore, an arrangement space of the drive magnet part 170 can be increased while an interference of the drive magnet part 170 with the arm part 50c is prevented. Therefore, in this embodiment, even when an outward size of the lens drive device 10 is not increased, the drive magnet part 170 can be formed larger and thus a drive force of the drive mechanism 40 is improved.

Especially in this embodiment, the first connection part 50e is formed at a substantially intermediate position of the straight side part 50d which structures the fixed body fixed part 50b. Therefore, arrangement spaces of the drive magnet parts 170 and the drive coils 180 can be increased while interferences of the drive magnet parts 170 and the drive coils 180, which are disposed at four corners of the lens drive device 10, with the arm parts 50c are prevented. Therefore, in this embodiment, even when an outward size of the lens drive device 10 is not increased, the drive magnet parts 170 and the drive coils 180 can be formed larger and thus a drive force of the drive mechanism 40 is enhanced.

Although the present invention has been shown and described with reference to a specific embodiment, various changes and modifications will be apparent to those skilled in the art from the teachings herein.

In the embodiment described above, the low spring constant part 50h is formed at one position of the intermediate portion in the circumferential direction of the arm part 50c. However, the present invention is not limited to this embodiment. For example, the low spring constant part 50h may be formed at plural positions (for example, two or three positions) of the arm part 50c. In other words, the width in the radial direction of the arm part 50c may be narrower at its plural positions. In this case, it is preferable that the low spring constant part 50h is formed with a substantially equal interval in the circumferential direction of the arm part 50c. According to the structure described above, the stress occurred in the flat spring 50 due to impact is distributed to the first connection part 50e, the second connection part 50g and a plurality of the low spring constant parts 50h in a well balanced manner and thus the stress in the first connection part 50e and the stress in the second connection part 50g due to the impact can be reduced in a well balanced manner.

In the embodiment described above, the width in the radial direction of the low spring constant part 50h is set to be narrower than the width in the radial direction of the other portion of the arm part 50c. However, the present invention is not limited to this embodiment. For example, the width in the radial direction of the low spring constant part 50h is set to be the same as the width in the radial direction of the other portion of the arm part 50c, and a thickness of the low spring constant part 50h may be set thinner than a thickness of the other portion of the arm part 50c. In other words, a thickness of a part of the arm part 50c may be set thinner than a thickness of the other portion of the arm part 50c to form the low spring constant part 50h in the arm part 50c. Also in this case, similarly to the embodiment described above, stress occurred in the flat spring 50 when an impact is applied to the lens drive device 10 is distributed to the first connection part 50e, the second connection part 50g and the low spring constant part 50h.

In the embodiment described above, the low spring constant part 50h is formed so that the outer peripheral face of the arm part 50c which is formed in a substantially circular arc shape is recessed toward its inner peripheral side. In other words, in the embodiment described above, the low spring constant part 50h is formed in a roughly circular arc shape whose outer peripheral face is formed in a straight shape. However, the present invention is not limited to this embodiment. For example, the low spring constant part 50h may be formed in a substantially linear shape, e.g., both peripheral faces are in straight shapes, whose width is narrower than the other portion of the arm part 50c. Further, the low spring constant part 50h may be formed so that a band-like portion whose width is narrower than the other portion of the arm part 50c is meandered. Further, the low spring constant part 50h may be formed so that an inner peripheral face of the arm part 50c which is formed in a substantially circular arc shape is recessed toward its outer peripheral side.

In the embodiment described above, the drive magnet parts 170 and the drive coils 180 are disposed at four corners of the lens drive device 10. However, the present invention is not limited to this embodiment. For example, when a drive force for the movable body 20 is capable of being obtained, the drive magnet part 170 and the drive coil 180 may be disposed at only one position or two or three positions of four corners of the lens drive device 10. In this case, a guide shaft for guiding the movable body 20 in the optical axis direction may be disposed at a corner part of the lens drive device 10 where the drive magnet part 170 and the drive coil 180 are not disposed and an engaging recessed part which engages with the guide shaft is formed on the sleeve 80. Further, in the embodiment described above, the drive coil 180 is fixed to the movable body 20 and the drive magnet part 170 is fixed to the fixed body 30. However, the drive magnet part 170 may be fixed to the movable body 20 and the drive coil 180 is fixed to the fixed body 30.

In the embodiment described above, the flat spring 50 is formed with four arm parts 50c. However, the present invention is not limited to this embodiment. For example, the number of the arm parts 50c formed in the flat spring 50 may be three or five or more. Further, in the embodiment described above, the flat spring 50 is used in the lens drive device 10 in which the drive magnet parts 170 and the drive coils 180 are disposed at four corners of the lens drive device 10. However, the flat spring in accordance with an embodiment of the present invention may be used in any lens drive device in which a movable body is held by a fixed body through a flat spring. For example, the flat spring in the embodiment described above may be used in the conventional lens drive device described in the above-mentioned Patent Reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device whose shape is substantially rectangular when viewed in an optical axis direction of a lens, the lens drive device comprising:
   a movable body which is provided with the lens and which is movable in the optical axis direction;
   a drive mechanism for driving the movable body in the optical axis direction, comprising:
     a substantially triangular prism-shaped drive magnet part which is disposed in at least one of four corners of the lens drive device; and
     a drive coil which is wound around a substantially triangular tube shape and whose inner peripheral face is oppositely disposed to an outer peripheral face of the drive magnet part through a gap space;
     wherein the drive magnet part is magnetized so that magnetic flux passing through the drive coil is generated at a position facing the drive coil; and
     wherein the drive magnet part is provided with two drive magnet pieces which are formed in a substantially triangular prism shape and are disposed to be superposed on each other in the optical axis direction, and opposite faces of the two drive magnet pieces to each other in the optical axis direction are magnetized in a same magnetic pole.

2. The lens device according to claim 1, wherein the two drive magnet pieces are separated from each other in the optical axis direction.

3. The lens drive device according to claim 2, wherein the drive magnet part is provided with a magnetic plate which is made of magnetic material and which is disposed between the two drive magnet pieces in the optical axis direction.

4. The lens drive device according to claim 2, wherein a width of the drive coil in the optical axis direction is set to be not less than a sum of a distance between the opposite faces of the two drive magnet pieces which face in the optical axis direction and a moving distance of the movable body.

5. The lens drive device according to claim 2, wherein
a substantially triangular prism-shaped drive magnet part is disposed at each of four corners of the lens drive device, and
magnetic poles which are formed on the opposite faces of the two drive magnet pieces are different from magnetic poles formed on opposite faces of two other drive magnet pieces which are adjacent to each other in a circumferential direction of the lens drive device.

6. The lens drive device according to claim 5, further comprising a case body which is formed of magnetic material in a substantially rectangular tube shape and which is disposed to surround the movable body and the drive mechanism.

7. The lens drive device according to claim 6, wherein an end face on an object to be photographed side of the drive magnet part is abutted with the case body and an end face on an opposite-to-object side of the drive magnet part is abutted with an opposite-to-object side magnetic member which is formed of magnetic material.

8. The lens drive device according to claim 7, wherein
the movable body includes a sleeve which is formed in a substantially cylindrical shape and whose inner peripheral side is disposed with the lens, and
the sleeve is provided with a small diameter part which is disposed on the object to be photographed side and a large diameter part which is disposed on the opposite-to-object side and whose outer diameter is larger than the small diameter part, and
the drive coil is fixed to an outer peripheral face of the small diameter part.

9. The lens drive device according to claim 5, wherein the drive coil comprises four drive coils which are disposed at the four corners of the lens drive device, and one conducting wire is successively wound around to form the four drive coils.

10. The lens drive device according to claim 5, wherein the drive coil comprises four drive coils which are disposed at the four corners of the lens drive device, and the four drive coils are formed of four conducting wires which are wound around respectively.

11. The lens drive device according to claim 1, wherein
a substantially triangular prism-shaped drive magnet part is disposed at each of four corners of the lens drive device, and
a magnetic pole which is formed at an intermediate position in the optical axis direction in the drive magnet part is different from magnetic poles formed on both ends in the optical axis direction of the drive magnet part.

12. The lens drive device according to claim 11, further comprising a case body which is formed of magnetic material in a substantially rectangular tube shape and which is disposed to surround the movable body and the drive mechanism.

13. The lens drive device according to claim 12, wherein an end face on an object to be photographed side of the drive magnet part is abutted with the case body and an end face on an opposite-to-object side of the drive magnet part is abutted with an opposite-to-object side magnetic member which is formed of magnetic material.

14. The lens drive device according to claim 11, wherein the drive coil comprises four drive coils which are disposed at the four corners of the lens drive device, and one conducting wire is successively wound around to form the four drive coils.

15. The lens drive device according to claim 11, wherein the drive coil comprises four drive coils which are disposed at the four corners of the lens drive device, and the four drive coils are formed of four conducting wires which are wound around respectively.

16. The lens drive device according to claim 1, further comprising a case body which is formed of magnetic material in a substantially rectangular tube shape and which is disposed to surround the movable body and the drive mechanism.

17. The lens drive device according to claim 16, wherein an end face on an object to be photographed side of the drive magnet part is abutted with the case body and an end face on an opposite-to-object side of the drive magnet part is abutted with an opposite-to-object side magnetic member which is formed of magnetic material.

18. The lens drive device according to claim 16, wherein
the movable body includes a sleeve which is formed in a substantially cylindrical shape and whose inner peripheral side is disposed with the lens, and
the sleeve is provided with a small diameter part which is disposed on the object to be photographed side and a large diameter part which is disposed on the opposite-to-object side and whose outer diameter is larger than the small diameter part, and
the drive coil is fixed to an outer peripheral face of the small diameter part.

19. A lens drive device comprising:
a movable body which holds a lens and which is movable in an optical axis direction of the lens;
a fixed body which movably holds the movable body in the optical axis direction;
a drive mechanism for driving the movable body in the optical axis direction; and
a flat spring which is provided with a movable body fixed part which is fixed to the movable body, a fixed body fixed part which is fixed to the fixed body, and a plurality of arm parts which connect the movable body fixed part with the fixed body fixed part;
wherein each of the plurality of arm parts is formed with a low spring constant part whose spring constant is smaller than a spring constant of an other portion of each of the plurality of arm parts; and
wherein the low spring constant part is formed so that an outer peripheral face of each of the plurality of arm parts is cut off in a substantially straight shape to be recessed toward an inner peripheral side.

20. The lens drive device according to claim 19, wherein each of the plurality of arm parts is formed in a substantially circular arc shape and the low spring constant part is formed at an intermediate portion in a circumferential direction of the plurality of arm parts.

21. The lens drive device according to claim 20, wherein a width of the low spring constant part in a radial direction of the plurality of arm parts is formed to be gradually narrower than a width in the radial direction of the other portion of each of the plurality of arm parts except the low spring constant part.

22. The lens drive device according to claim 21, wherein the low spring constant part is formed with a substantially equal interval in the circumferential direction of the plurality of arm parts.

23. The lens drive device according to claim 21, wherein the drive mechanism comprises:
   a drive magnet part which is formed in a substantially column shape and which is fixed to the fixed body; and
   a drive coil which is wound around in a substantially tube shape, which is fixed to the movable body, and which is disposed so that an inner peripheral face of the drive coil faces an outer peripheral face of the drive magnet part through a gap space, and
   the drive magnet part is disposed on an outer side in the radial direction of the plurality of arm parts, and
   the low spring constant part is formed so that an outer peripheral face of each of the plurality of arm parts is recessed toward an inner peripheral side of the arm part.

24. The lens drive device according to claim 19, wherein
   the plurality of the arm parts are disposed with a substantially equal angular pitch around an optical axis of the lens, and
   the low spring constant parts of the plurality of the arm parts are disposed with a substantially equal angular pitch around the optical axis.

25. The lens drive device according to claim 24, wherein each of the plurality arm parts is formed in a substantially circular arc shape, and
   the low spring constant part is formed with a substantially equal interval in a circumferential direction of the plurality of arm parts.

26. The lens drive device according to claim 24, wherein each of the plurality of arm parts is formed in a substantially circular arc shape, and
   a width of the low spring constant part in a radial direction of the plurality arm parts is formed to be narrower than a width in the radial direction of the other portion of each of the plurality of arm parts except the low spring constant part.

27. The lens drive device according to claim 26, wherein the drive mechanism comprises:
   a drive magnet part which is formed in a substantially column shape and which is fixed to the fixed body; and
   a drive coil which is wound around in a substantially tube shape, which is fixed to the movable body, and which is disposed so that an inner peripheral face of the drive coil faces an outer peripheral face of the drive magnet part through a gap space; and
   the drive magnet part is disposed on an outer side in the radial direction of the plurality of arm parts; and
   the low spring constant part is formed so that an outer peripheral face of each of the plurality of arm parts is recessed toward an inner peripheral side of the arm part.

28. The lens drive device according to claim 19, further comprising a case body which is formed in a substantially rectangular tube shape so that a shape of the case body when viewed in the optical axis direction is formed in a substantially rectangular shape, and which structures a side face of the lens drive device,
   wherein the drive mechanism comprises:
      a substantially triangular prism-shaped drive magnet part which is disposed in at least one of four corners of the case body; and
      a drive coil which is wound around in a substantially triangular tube shape and which is disposed so that an inner peripheral face of the drive coil faces an outer peripheral face of the drive magnet part through a gap space; and
   wherein the fixed body fixed part is formed in a substantially rectangular frame shape and is disposed along an inner peripheral face of the case body, and the movable body fixed part is disposed on an inner side of the fixed body fixed part, and connected portions of the fixed body fixed part with the plurality of arm parts are formed at substantially intermediate positions of four straight side parts structuring the fixed body fixed part.

29. The lens drive device according to claim 28, wherein the plurality of arm parts is formed in a substantially circular arc shape, and
   a width of the low spring constant part in a radial direction of the plurality of arm parts is formed to be narrower than a width in the radial direction of the other portion of each of the plurality of arm parts except the low spring constant part.

30. The lens drive device according to claim 29, wherein the drive magnet part is disposed on an outer side in the radial direction of the plurality of arm parts, and
   the low spring constant part is formed so that an outer peripheral face of each of the plurality of arm parts is recessed toward an inner peripheral side of the arm part.

31. The lens drive device according to claim 30, wherein the low spring constant part is formed so that an outer peripheral face of each of the plurality of arm parts facing a straight part of the substantially triangular prism-shaped drive magnet part is cut off in a substantially straight shape.

* * * * *